US005231505A

United States Patent [19]

Watanabe et al.

[11] Patent Number: 5,231,505

[45] Date of Patent: Jul. 27, 1993

[54] REWRITABLE RECORDING DISPLAY APPARATUS AND METHOD OF ERASING RECORD

[75] Inventors: Niro Watanabe; Yoshihiro Hino, both of Tokyo; Masashi Tamura; Masaru Ohnishi, both of Kamakura; Keiki Yamada; Takashi Hiroishi, both of Kamakura; Narihiro Matoba, Kamakura, all of Japan

[73] Assignees: Mitsubishi Denki K.K.; Toppan Printing Co., Ltd., both of Tokyo, Japan

[21] Appl. No.: 715,925

[22] Filed: Jun. 14, 1991

[30] Foreign Application Priority Data

| | | | |
|---|---|---|---|
| Jun. 14, 1990 | [JP] | Japan | 2-157937 |
| Jun. 14, 1990 | [JP] | Japan | 2-157938 |
| Jun. 14, 1990 | [JP] | Japan | 2-157939 |
| Nov. 27, 1990 | [JP] | Japan | 2-324574 |
| Feb. 19, 1991 | [JP] | Japan | 3-24532 |

[51] Int. Cl.$^5$ ........................ H04N 1/23; G01D 9/12; G01D 15/10

[52] U.S. Cl. ................................ 358/296; 346/76 L; 346/139 A; 346/21

[58] Field of Search ................ 358/296; 346/21, 76 L, 346/135.1, 139 A; 101/141, 142; 430/290

[56] References Cited

U.S. PATENT DOCUMENTS

| | | | |
|---|---|---|---|
| 3,683,336 | 8/1972 | Brownlee et al. . | |
| 3,789,420 | 1/1974 | Claytor et al. . | |
| 4,700,200 | 10/1987 | Hibino . | |
| 4,720,707 | 1/1988 | Konishi et al. | 346/139 A |
| 4,765,654 | 8/1988 | Nakamura . | |
| 4,837,071 | 6/1989 | Tagoku et al. . | |

FOREIGN PATENT DOCUMENTS

| | | |
|---|---|---|
| 0418399 | 4/1990 | European Pat. Off. . |
| 57-117140 | 7/1982 | Japan . |
| 62-116191 | 5/1987 | Japan . |
| 62-1161190 | 5/1987 | Japan . |

OTHER PUBLICATIONS

European Search Report dated Mar. 24, 1992.

English Abstract of Japanese Patent Laid-Open No. 62-116191 (1987).

English Abstract of Japanese Patent Laid-Open No. 62-116190 (1987).

English Abstract of Japanese Patent Laid-Open No. 57-117140 (1982).

*Primary Examiner*—Benjamin R. Fuller
*Assistant Examiner*—Eric Frahm
*Attorney, Agent, or Firm*—Rothwell, Figg, Ernst & Kurz

[57] ABSTRACT

A rewritable recording/display apparatus using a rewritable recording medium in which color development reaction occurs by thermal energy at a predetermined temperature, and in which a color extinguishing reaction occurs by thermal energy at a temperature lower than the color development temperature, and which is capable of repeatingly performing recording and erasing of images. The apparatus also has a color developing heating device for recording an image on the rewritable recording medium by heating the rewritable recording medium, and an erasing heating device for erasing the image after the image has been recorded. Thus, the apparatus is designed so as to have a recording section simplified and reduced in size, and to reduce the maintenance and running cost. A method of erasing a rewritable record enables images to be erased completely or suitably in terms of practice and enables formation of high-quality image after erasing of the previous image.

10 Claims, 24 Drawing Sheets

REWRITABLE RECORDING DISPLAY APPARATUS AND METHOD OF ERASING RECORD

BACKGROUND OF THE INVENTION

1. Field of the Invention

This invention relates to a rewritable recording/display apparatus using a rewritable recording film capable of repeatingly recording or erasing information and to a method of erasing a record.

2. Description of the Related Art

Apparatuses such as thermal recording apparatuses or thermal transfer recording apparatuses in which a heating means, e.g., a thermal head or laser light is used to perform recording or display are applied to various kinds of recording/display apparatuses including printers, facsimile apparatuses and displays. For example, for a recording unit of a facsimile apparatus using a thermal recording sheet, a method is ordinarily used in which an image is formed based on selectively energizing heating elements on a thermal head at predetermined times in accordance with an input recording signal so as to develop a color on the thermal recording sheet at desired positions. With respect to recording units of computers or word processors, thermal transfer type recording apparatuses are widely used in which heating elements of a thermal head are selectively energized to melt ink of an ink ribbon, the melted ink being transferred to a recording sheet. In the case of such thermal recording or thermal transfer recording, however, the recorded image cannot be erased and the same recording sheet cannot be used again to record a different desired image.

Examples of the conventional display and facsimile apparatuses will be described below.

FIG. 36 is a longitudinal sectional side view of a conventional display apparatus such as the one described in "Information display apparatus using a toner image" (Yojiro Ando et al , pp 119 to 122) of the theses of the workshop, Fine Image (Nihon Shashin Gakkai, Denshi Shashin Gakkai, SPSE Tokyo Branch, 1989).

As shown in FIG. 36, a frame 1 provided as a main body of the display apparatus has a front glass 2 which constitutes a display screen. Upper and lower sheet rollers 3 and 4 are disposed in the frame 1. A recording medium or recording sheet 5 is wrapped around and supported on the sheet rollers 3 and 4 and is moved therearound. The recording sheet 5 is formed of an endless belt on which a toner image is formed and displayed. A magnet roller 7 provided to form a toner image on the recording sheet 5 is controlled by a controller 8. A recording section for forming a toner image on the recording sheet includes toner 6, the magnet roller 7 and the controller 8. A driver IC 9 and a cleaner 10 for scraping off the toner image formed on the recording sheet 5 are also provided.

The operation of this apparatus is as described below. On the recording sheet 5 supported and fed by the upper and lower sheet rollers 3 and 4, a toner image is formed by the magnet roller 7 under the operation of the controller 8 during feeding of the recording sheet 5. After one frame of toner image has been formed, the recording sheet 5 is stopped to display the image. After being displayed, the toner image on the recording sheet 5 is scraped off by the cleaner 10 as the recording sheet 5 is moved. The recording sheet 5 and the toner thereby become ready for being used again.

FIG. 37 is a schematic longitudinal sectional side view of a conventional facsimile apparatus such as the one described on page 47(725) of Mitsubishi Denki Giho Vol.55, No.10, 1981. Energization pulses in accordance with a recording pattern to be recorded on a thermal recording sheet 13 described below are applied to a thermal head 11 to develop a colored image on the thermal recording sheet 13. An unrolled portion of a roll of thermal recording sheet 13 is led to the thermal head 11 along a transport guide **16*a* and is pressed against the thermal head 11 by a platen roller 14. The portion of thermal recording sheet 13 on which a colored image is recorded is guided to a discharge tray 1*a* by a transport guide 16*b* and guide rollers 15*a* and 15*b***.

The operation of this apparatus is as described below. Thermal recording sheet 13 is transported to the recording position between the thermal head 11 and the platen roller 14 by being led along the transport guide **16*a*. Energization pulses in accordance with a recording pattern to be recorded on the thermal recording sheet 13 are applied to the thermal head 11, and the thermal head 11 thereby produces heat to form a corresponding colored image on the thermal recording sheet by color development. The portion of thermal recording sheet 13 on which the colored image is formed is sent to the discharge tray la by being led by the guide rollers 15*a*, the transport guide 16*b* and the guide rollers 15*b***.

In the conventional display apparatus arranged as described above, the construction of the recording section including toner 6, magnet roller 7 and controller 8 is complicated. There are therefore the problems of difficulty in reducing the size of the recording section, impossibility of completely recovering and using toner 6, and need to resupply toner 6 and to perform maintenance operations. In the facsimile apparatus constructed as described above, thermal recording sheet 13 once used for recording cannot be used again, and new recording sheet 13 is required for each recording. The running cost of this apparatus is therefore high.

FIG. 38 is a cross-sectional view of a conventional facsimile apparatus such as the one described on page 210 of Nikkei Electronics, Nov. 16, 1987. A control unit (not shown) and other units are provided on a control circuit board 22. An original 26 is transported by a sheet feed roller 24. If a plurality of original sheets 26 are set, they are separated one by one by a separation member 25. The image on each original 26 is read by a close-contact type image sensor 27. The original 26 is brought into close contact with the image sensor 27 by a platen roller 28. The image read by the close-contact type image sensor 27 is recorded on a recording sheet 29 by a thermal head 30. The recording sheet 29 is brought into close contact with the thermal head 30 by a platen roller 31. The apparatus has a power source 21.

The operation of this apparatus is as described below. At the time of reception, an image signal received from a facsimile apparatus on the other end of the line is first supplied to the control circuit board 22. A decoding unit provided on the control circuit board 22 decodes the image signal into an image line by line and sends a recording signal corresponding to the image to the thermal head 30. Recording is effected on the recording sheet 29 based on the recording signal by the thermal head 30. The platen roller 31 is rotated to an extent corresponding to one line at a time to move the recording sheet 29 in a direction a. This operation is conducted with respect to one page to record the image corresponding to one page on the recording sheet 29. Needless to say, recording cannot be performed when the amount of remaining recording sheet 29 is zero. Ordinarily, the apparatus is unable to receive recording signals in such a case.

A type of facsimile apparatus is known in which a memory for storing image signals is provided on the control circuit board 22. This facsimile apparatus automatically stores received image signals in the memory when the amount of remaining recording sheet 29 is reduced to zero during reception. When recording sheet 29 is resupplied to enable the recording operation, the image corresponding to the image signals stored in the memory is recorded on the recording sheet automatically or by a recording instruction input through an operation panel 23. In a case where reception is started while there is no recording sheet 29, received image signals are stored in the memory.

At the time of transmission, original 26 is inserted to the position of the feed roller 24. The original 26 is moved in the direction b to the position of the close-contact type image sensor 27 by following the rotation of the feed roller 24. At this time, if a plurality of original sheets 26 are inserted in a superposed state, they are separated one by one by the separation member 25. The original 26 is moved by the platen roller 28 while the image is being read by the close-contact type image sensor 27. The image read by the image sensor 27 is encoded by an encoding unit provided on the control circuit board 22 and the encoded signal is transmitted to the terminal at the other end of the line designated through the operation panel 23.

The conventional facsimile apparatuses arranged as described above entail the following drawbacks. In the case of those having no memory, if the frequency of reception is high, recording sheets must be resupplied frequently, which is inconvenient for the user. Also the running cost is thereby increased.

Even if a memory is provided, troublesome user operations are also required. That is, a memory overflow easily occurs if the frequency of reception is high. In such a case, the reception cannot be continued and it is necessary to request that the original should be transmitted again from the other end.

In the case of recording/display apparatuses for word processors or computers, a document or a program is written by being frequently modified or corrected to be completed based on document data output to recording sheets or a program list (test printing is frequently effected). Recording sheets are thereby wasted and the writing cost per unit document or program is increased.

In a case where a document formed by a word processor or the like is corrected and checked while being displayed on the screen of a CRT or a liquid crystal display without being printed, the image of the document is ordinarily displayed by being reduced so that the whole of the document can be displayed in one frame. However, since the resolution of such display devices is ordinarily low, characters of the document cannot be formed finely and it is difficult to discriminate the characters to elaborate the sentences while continuously displaying the one-frame image. For this reason, the number of test prints and, hence, the running cost cannot be reduced.

Other apparatuses, such as those disclosed in Japanese Patent Laid-Open Nos.57-117978, 62-116191, 64-18353, 648354, and 64-18355, are also included in the related art.

On the other hand, rewritable recording films capable of repeated recording and erasing with a heating means such as a thermal head or laser light have recently been developed. For example, resin or organic low molecular weight materials films disclosed in U.S. Pat. No. 4,695,528, Japanese Patent Laid-Open Nos.55-154198 and 57-82086 and dyestuff films such as those disclosed in WO 90/11898 and Japanese Patent Laid-Open 02-188294 are known as such rewritable recording films.

More specifically, the former type is formed of a matrix material consisting of a thermoplastic resin or the like, and an organic low molecular weight material dispersed in the matrix material, and has characteristics such that its state is changed according to the temperature at which it is maintained, and which is higher than a particular temperature T0. That is, there are two state transition temperatures T1 and T2 (T1<T2) higher than T0. When the film is cooled to a temperature equal to or lower than T0 after being heated and maintained at a temperature equal to or higher than T2, it becomes cloudy and is set in a maximum light shielding state. When the cloudy recording layer is cooled to a temperature equal to or lower than T0 after being heated and maintained at a temperature equal to or higher than T1 and lower than T2, it becomes transparent. These changes in state are mainly based on changes of the organic low molecular weight material in the recording layer.

The state of the latter type of rewritable recording film can be changed by energy control alone. That is, lactone rings are opened by high-temperature heating to form a compound having a color, and the lactone rings are closed by low-temperature heating to restore a colorless leuco compound. This phenomenon is due to the structure of the color developing/reducing agent and the reversibility of the leuco compound. As color developing/reducing agents, salt of gallic acid and aliphatic amine and other compounds are known. In the above-described examples, recording is effected by first thermal energy (high temperature) and erasing is effected by second thermal energy (low temperature), so that recording can be repeated only by controlling the thermal energy.

However, the above-described conventional recording and display apparatuses are not designed to use these rewritable recording films, and have no erasing function.

SUMMARY OF THE INVENTION

In view of the above-described problems, an object of the present invention is to provide a rewritable recording/display apparatus which is capable of being repeatedly used to record and erase colored images by thermal energy, in which the construction of the recording section can be simplified and reduced in size, and which can be designed so as to reduce the maintenance cost and the running cost.

Another object of the present invention is to provide an erasing method for rewritable recording which enables complete erasing satisfactory in terms of practice (to an extent such that the recording medium can be reused), and formation of a high-quality colored image when the image is formed after erasing.

In order to achieve the above objects, according to the present invention, there is provided a rewritable recording/display apparatus comprising: a rewritable recording medium in which color development reaction occurs by thermal energy at a predetermined temperature, and in which a color extinguishing reaction occurs by thermal energy at a temperature lower than the color development temperature, the rewritable recording medium being capable of repeatingly performing recording and erasing of images; a color developing heating means for recording an image on the rewritable recording medium by heating the rewritable recording medium so as to cause the color developing reaction; and an erasing heating means for erasing the image after the image has been recorded. The rewritable recording/display apparatus is a display apparatus or a facsimile apparatus. The color developing heating means or the erasing heating means includes a thermal head, an LED head, a liquid crystal head, or a laser head.

DESCRIPTION OF THE PREFERRED EMBODIMENTS

Embodiments of the present invention will be described below with reference to the accompanying drawings.

EMBODIMENT 1

Figure 1:
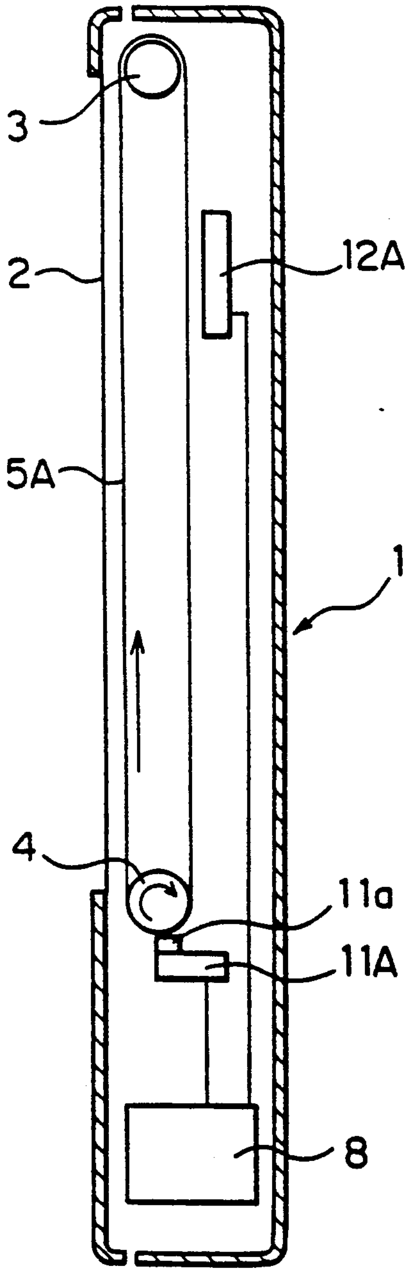
FIG. 1 is a sectional side view of a display apparatus in accordance with a first embodiment of the present invention.
Figure 36:
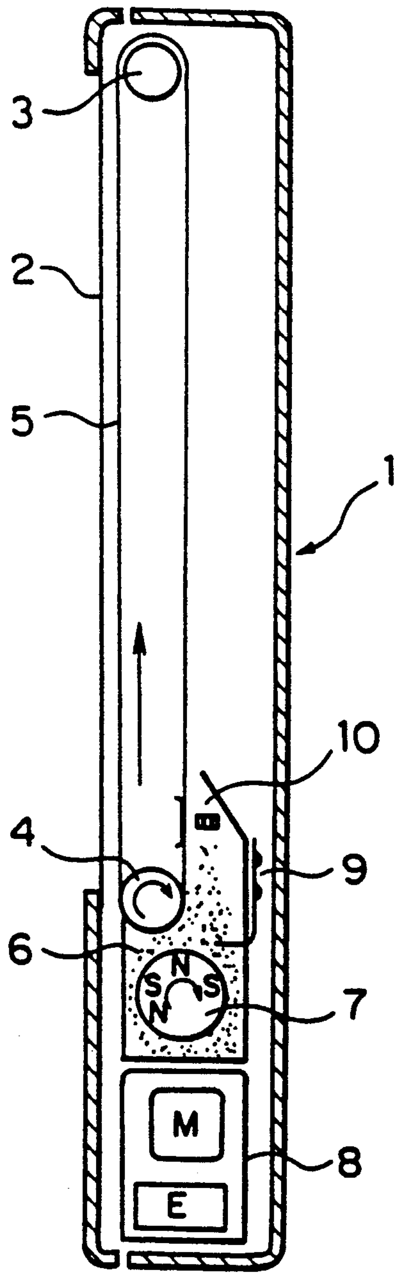
FIG. 36 PRIOR ART
FIG. 36 is a sectional side view of a conventional display apparatus.
Figure 37:
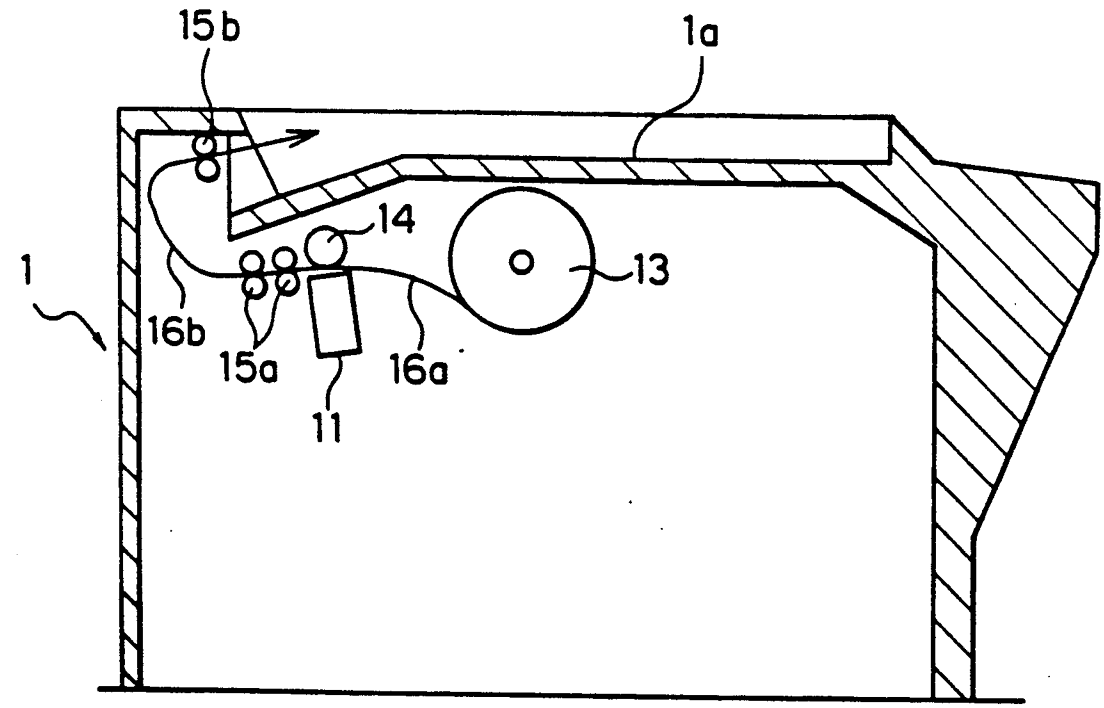
FIG. 37 PRIOR ART
FIG. 37 is a sectional side view of a conventional facsimile apparatus.

FIG. 1 is a longitudinal sectional side view of a rewritable recording/display apparatus, i.e., a display apparatus in accordance with the first embodiment of the present invention. Components identical or corresponding to those shown in FIGS. 36 and 37 are indicated by the same reference characters, and the description for them will not be repeated.

As shown in FIG. 1, a rewritable recording medium (heat reversible recording medium) 5A is wrapped around and supported on sheet rollers 3 and 4 and is moved therearound. As the rewritable recording medium 5A, a color developing dyestuff agent, for example, is used in which a coloring reaction occurs by thermal energy at a predetermined temperature, and in which a color extinguishing reaction occurs by thermal energy at a temperature lower than that at the time of color development. This agent will be described later in detail. A color development heating means, e.g., a thermal head 11A is disposed in a frame 1 at a lower position. The thermal head 11A has heating elements 11*a* which are energized under the control of a controller 8 to heat up the rewritable recording medium 5A to the predetermined temperature (color developing temperature).

An eraser 12A is also provided in the frame 1. The eraser 12A is controlled by the controller 8 to heat the rewritable recording medium 5A at a temperature lower than the color developing temperature after a colored image has been formed and displayed.

The controller 8 for controlling the thermal head 11A and the eraser 12A controls one of the voltage applied to the thermal head 11A or the eraser 12A, the energization time, and the number of energizing pulses.

Details of the rewritable recording medium 5A will now be described below. The rewritable recording medium 5A is formed of a base, a recording layer, and a protective layer. The recording layer is formed of a leuco dyestuff containing a leuco compound, a color developing/reducing agent for developing or reducing a color by thermally reacting with the leuco compound, a binder and other materials.

The color developing/reducing agent is a compound including, in one molecule, a radical having a color developing property with respect to the leuco dyestuff by the effect of heat, and a radical having a color reducing property. The color developing/reducing agent exhibits properties of an acid or properties of a base according to the effect of heat. For example, it is a salt of phenolic carboxylic acid and organic amine represented by the following formula:

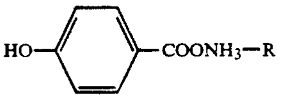

(R: alkyl group)

The phenolic hydroxyl group of this structural formula is a group having a color developing property with respect to the leuco compound; it serves to make the leuco compound develop a color by opening the lactone rings of the leuco compound. The amine salt of the carboxylic acid is a group having a color reducing property with respect to the leuco compound; it serves to restore the colorless state of the leuco compound by closing the lactone rings thereof.

Ordinarily, a leuco compound is changed from a colorless state to a colored state by thermally reacting with a phenolic compound so that its lactone rings are opened. The colored leuco compound with its lactone rings opened is restored to the colorless leuco compound by contacting a basic substance so that its lactone rings are closed. The colored leuco compound and the colorless leuco compound are expressed by the following structural formulae:

(Colorless leuco compound)

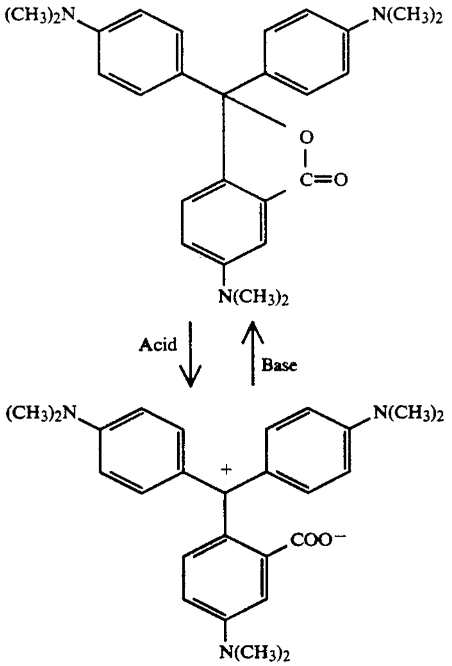

(Colored leuco compound)

Thus, the color developing/reducing agent has the property of opening the lactone rings of a colorless leuco compound to change the same into a colored compound only by thermal energy control, and the property of closing the lactone rings to restore the colorless leuco compound.

The operation of this embodiment will be described below. The rewritable recording medium supported by the upper and lower sheet rollers 3 and 4 is moved in a longitudinal direction. The heating elements 11*a* of the thermal head 11A are energized while the controller 8 controls the voltage applied to the thermal head 11A, the energization time or the number of energizing pulses. The rewritable recording medium 5A which is being moved is thereby heated to the color developing temperature. The color developing reaction on the rewritable recording medium 5A is thereby started to record a colored image on the rewritable recording medium 5A. After the colored image corresponding to one frame has been recorded on the rewritable recording medium 5A in this manner, the movement of the rewritable recording medium 5A is stopped and the image formed thereon is displayed. After being displayed, the colored image on the rewritable recording medium 5A (image recording portion) is erased as the recording medium is heated to the color extinguishing temperature lower than the color developing temperature by the eraser 12. Consequently, it is possible to repeat this process of recording a colored image on the rewritable recording medium 5A, displaying the colored image after recording, and erasing the image after displaying.

EMBODIMENT 2

Figure 2:
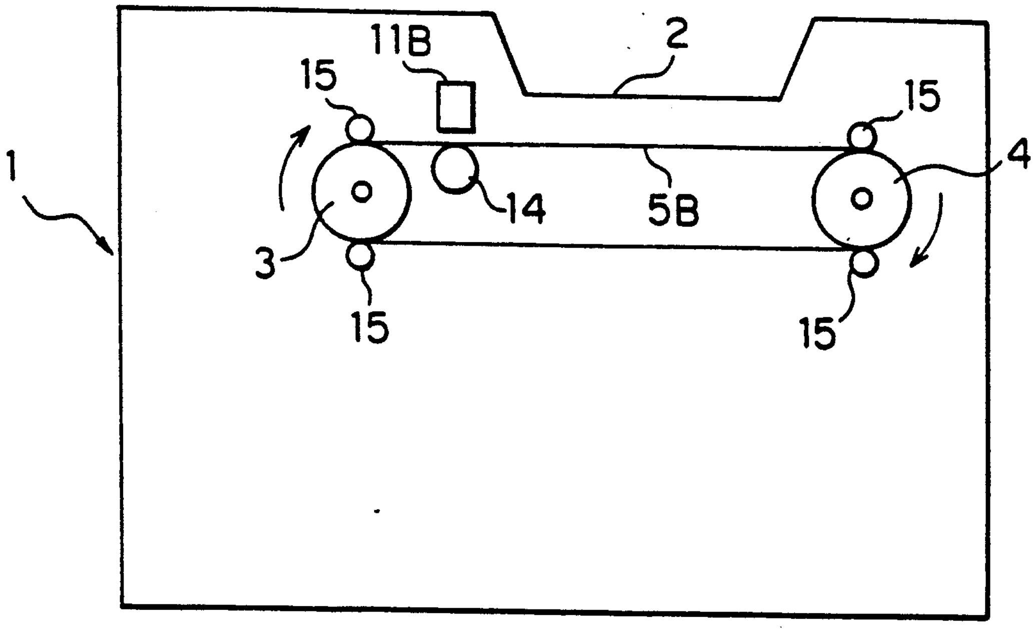
FIG. 2 is a schematic cross-sectional view of a facsimile apparatus in accordance with a second embodiment of the present invention.
Figure 3:
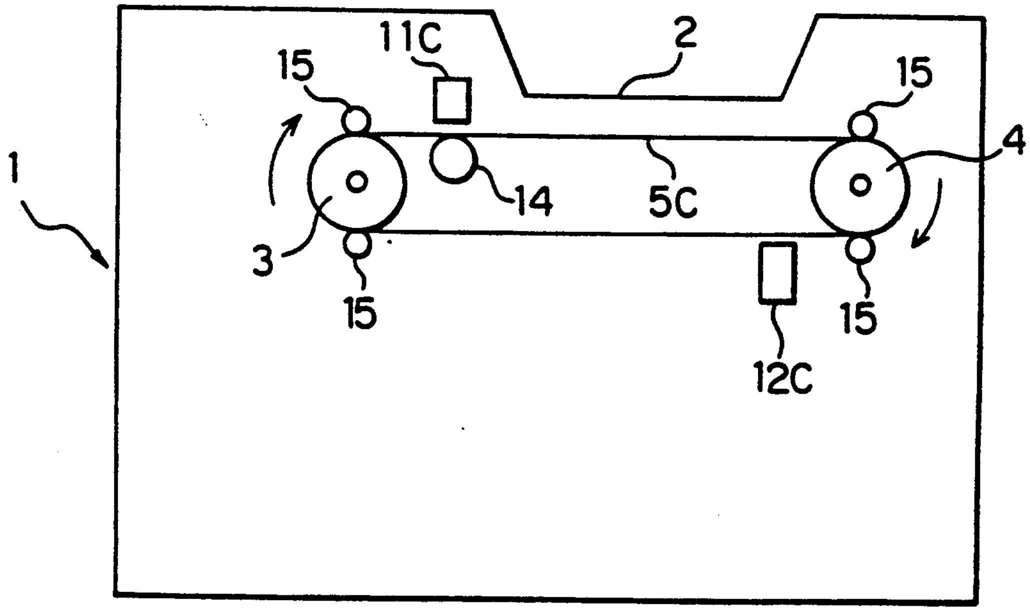
FIG. 3 is a schematic cross-sectional view of a state in which the facsimile apparatus shown in FIG. 2 is provided with a stationary heating member.

FIGS. 2 and 3 are longitudinal sectional side views of a facsimile apparatus in accordance with another embodiment of the present invention. Components identical or corresponding to those shown in FIGS. 1, 36 and 37 are indicated by the same reference characters, and the description for them will not be repeated.

As shown in FIG. 2 and 3, rewritable recording mediums (heat reversible recording medium) 5B and 5C in the form of endless belts are wrapped around and supported on left and right sheet rollers 3 and 4 and are moved therearound. Each of the rewritable recording mediums 5B and 5C is the same as that for use in the above-described display apparatus. Thermal heads 11B and 11C are capable of effecting color development on the rewritable recording mediums 5B and 5C to record colored images thereon. The thermal head 11B is capable of erasing the recorded colored images (removing colors). Platen rollers 14 are provided which serve to press the rewritable recording mediums 5B and 5C so that these mediums closely contact the thermal heads 11B and 11C. There are also provided pinch rollers 15 which, in cooperation with the sheet rollers 3 and 4, pinch the rewritable recording mediums 5B and 5C to move these mediums, and display windows 2 through which the results of recording on the rewritable recording mediums 5B and 5C are confirmed. In the arrangement shown in FIG. 3 is also provided a stationary heating member (image erasing means) 12C for erasing colored images recorded on the rewritable recording medium 5C. The colored images recorded on the rewritable recording mediums 5B and 5C can be erased by the control of the thermal heads 11B and 11C or by the stationary heating member 12C.

The operation of this apparatus is as described below. The recording areas of the rewritable recording medium 5B or 5C supported by the left and right sheet rollers 3 and 4 are moved in a lateral direction, and the heating elements of the thermal head 11B or 11C are energized while the controller 8 controls the voltage applied to the thermal head 11B or 11C, the energization time or the number of energizing pulses. The rewritable recording medium 5B or 5C which is being moved is thereby heated to the color developing temperature. The color developing reaction on the rewritable recording medium 5B or 5C is thereby started to record a colored image on the rewritable recording medium 5B or 5C. After the colored image corresponding to one frame has been recorded on the rewritable recording medium 5B or 5C in this manner, the movement of the rewritable recording medium 5B or 5C is stopped and the image formed thereon is displayed. After being displayed, the colored image on the rewritable recording medium 5B or 5C (image recording portion) is erased as the recording medium is heated to the color extinguishing temperature lower than the color developing temperature by the erasing function of the thermal head 11B or 11C or by the stationary heating element 12C. Consequently, it is possible to repeat this process of recording a colored image on the rewritable recording medium 5B or 5C, displaying the colored image after recording, and erasing the image after displaying.

An apparatus in which the rewritable recording medium 5A is scrolled in a longitudinal direction has been described with respect to the embodiment of the display apparatus. However, the rewritable recording medium 5A may be scrolled in a lateral direction based on the same principle and structure as this display apparatus. The same effect can thereby be obtained. Also, an apparatus in which the rewritable recording medium 5B or 5C is scrolled in a lateral direction has been described with respect to the embodiment of the facsimile apparatus. The rewritable recording medium 5B or 5C may be scrolled in a longitudinal direction based on the same principle and structure as this facsimile apparatus to obtain the same effect.

In the above-described embodiments, one frame of colored image is recorded and displayed on each of the rewritable recording mediums 5A to 5C and is thereafter erased. However, the rewritable recording mediums 5A to 5C may have a sufficiently long length with respect to the front glass and the display window 2 which constitute the display screen, such that several frames of colored image can be stored on each of the rewritable recording mediums 5A to 5C. In this case, the controller 8 may have a function of selecting the displayed frame, and it is thereby possible to selectively display several frames of colored image stored on the rewritable recording mediums 5A to 5C.

In the above-described embodiments, each of the rewritable recording mediums 5A to 5C is in the form of an endless belt. Alternatively, each of the rewritable recording mediums 5A to 5C may be provided as a finite belt whose opposite ends or one end is wound into a roll. In this case, several frames of colored image information can be recorded on each of the rewritable recording mediums 5A to 5C, and the system may be developed so that several frames of colored image recorded can be selectively displayed.

The positions in which the thermal heads 11A to 11C and the erasers (color extinguishing heating means) 12A to 12C are disposed may be different from those in the above-described embodiments and are not particularly limited.

Each of the thermal heads 11A to 11C and the erasers 12A to 12C may be of a fixed type or a movable type.

EMBODIMENT 3

Figure 4:
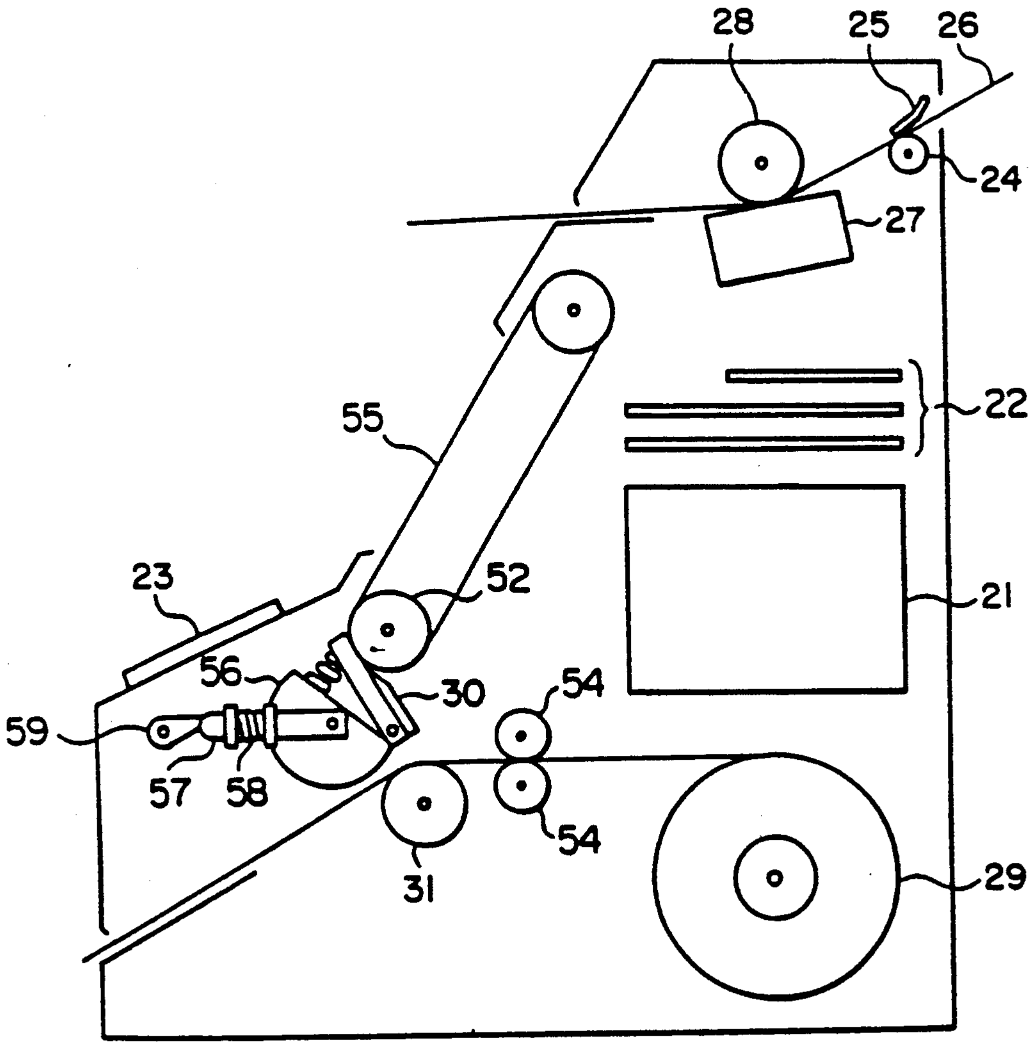
FIG. 4 is a schematic cross-sectional view of a facsimile apparatus in accordance with a third embodiment of the present invention.
Figure 38:
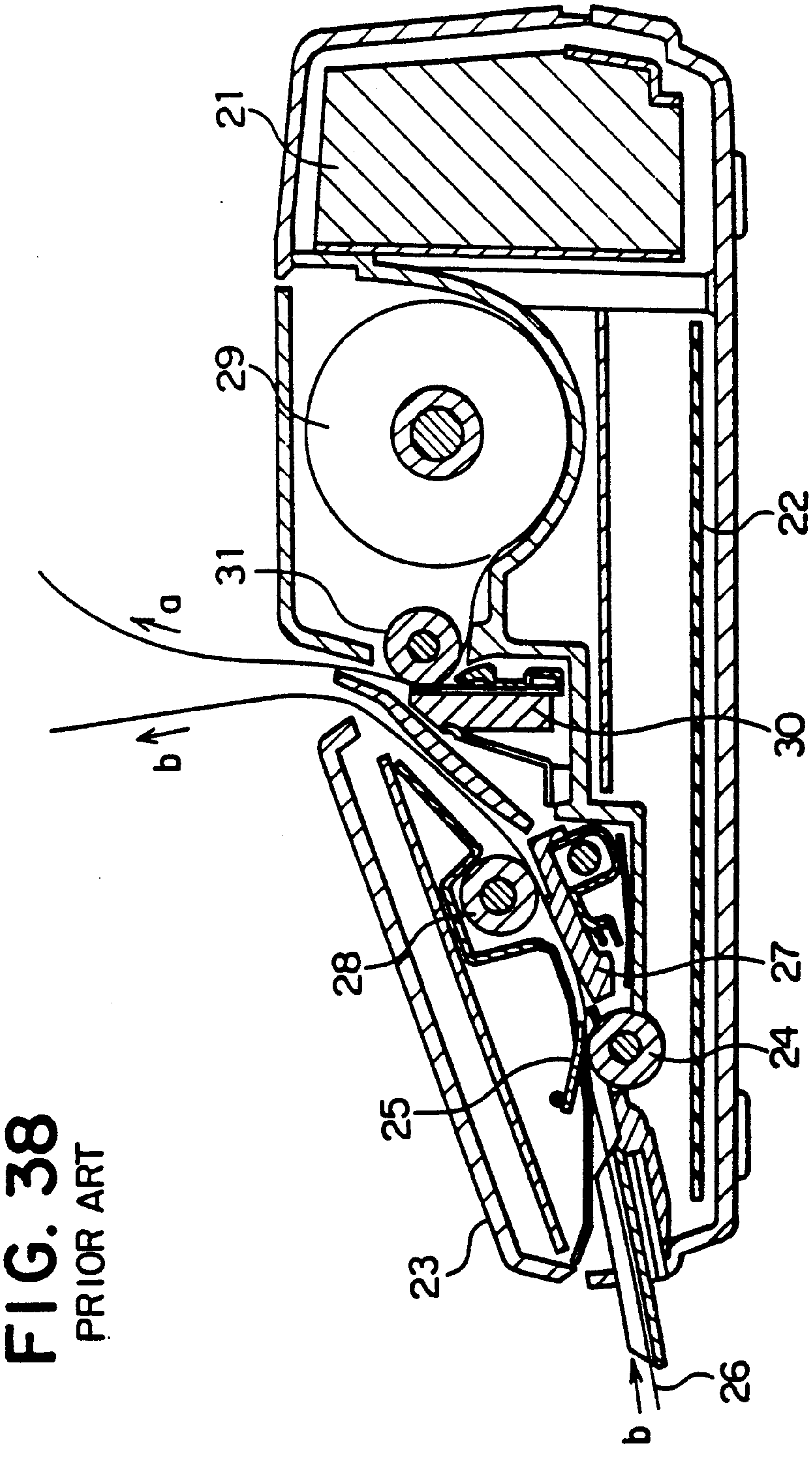
FIG. 38 PRIOR ART
FIG. 38 is a sectional side view of another conventional facsimile apparatus.

A facsimile apparatus in accordance with a third embodiment of the present invention will be described below. Referring to FIG. 4, a roller 52 serves to move a rewritable recording film (medium) 55 and to make the same closely contact a thermal head 50. The thermal head 50 is fixed on a rotatable head fixing base 56. The position of the thermal head 50 is changed over between a roller 52 side and a platen roller 51 side by the base 56. A rotary shaft of the head fixing base 56 is fixed by a right end of a support rod 57. A spring 58 is fixed at its right end to the apparatus body and is retained in a hole in which the support rod 57 is inserted. The spring 58 is engaged at its left end with an annular projection on the support rod 57 to urge the support rod 57 leftward. The head fixing base 56 supported by the support rod 57 is moved to the left or right by a cam 59 and by utilizing the resiliency force of the spring 58. Other components are the same as those of the apparatus shown in FIG. 38 and are indicated by the same reference characters. In this embodiment, the thermal head 50 is provided as both examples of a recording means and a rewriting recording means, that is, used for two purposes.

Figure 5:
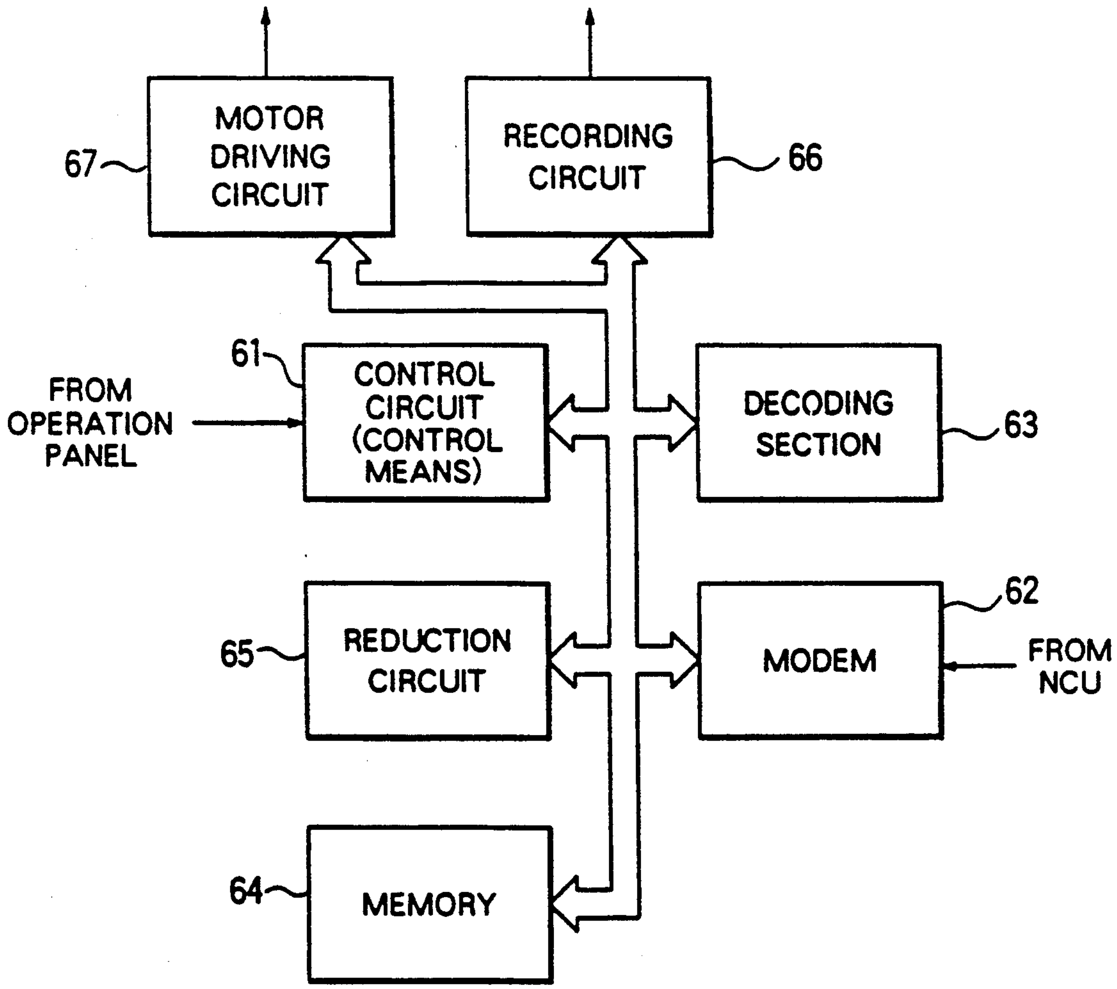
FIG. 5 is a block diagram of an electrical circuit relating to recording of the facsimile apparatus shown in FIG. 4.

FIG. 5 is a block diagram of portions of an electrical circuit provided on a control circuit board 22, which relate to the recording operation. A control circuit (control means) 61 controls other blocks and rotates the head fixing base 56. A modem 62 is connected to a telephone line through a network control unit (NCU) and demodulates an image signal formed by encoding an image from signals received through the telephone line. A decoding section 63 decodes the image signal and outputs the corresponding image. The image signal is stored in the memory 64. A reduction circuit 65 reduces the image size. A recording circuit 66 supplies a recording signal corresponding to pixels of the image to the thermal head 50. A drive circuit 67 supplies drive signals to motors (not shown in FIG. 4) for rotating the cam 59 and the roller 52. The control circuit board 22, the thermal head 50 and other components are connected through a cable, although the connections are not shown in FIG. 4. A microprocessor constitutes the control circuit 61.

The operation of this facsimile apparatus will be described below. First, it will be described with respect to a case where the rewritable film 55 and a recording sheet 49 are selected and used by the user. If the user wishes to record a received image on the rewritable film 55, he previously inputs a corresponding instruction through an operation panel 43. The control circuit 61 then recognizes this instruction. If at this time the thermal head 50 is at the position on the rewritable film 55 side, the control circuit 61 effects no operation, but, if the thermal head 50 is at the position on the recording sheet 49 side and in close contact with the platen roller 51, it instructs the motor drive circuit 67 to rotate the motor for rotating the cam 59. The cam 59 is thereby rotated through 180° and the support rod 57 is correspondingly moved to the left together with the head fixing base 56 by the resiliency force of the spring 58. Then, the head fixing base 56 is rotated counterclockwise to the predetermined position at which the image is recorded on the rewritable film 55 by the thermal head 50. The cam 59 is further rotated through 180° and the support rod 57 is correspondingly forced to the right. The head fixing base 56 supported by the support rod 57 is therefore forced rightward so that the thermal head 50 fixed on the head fixing base 56 is brought into close contact with the roller 52.

If the user wishes to record a received image on the recording sheet 49, he previously inputs a corresponding instruction through the operation panel 43. The control circuit 61 then recognizes this instruction. If at this time the thermal head 50 is at the position on the recording sheet 49 side, the control circuit 61 effects no operation, but, if the thermal head 50 is at the position on the rewritable film 55 side and in close contact with the roller 52, it outputs an instruction to change over the position of the thermal head 50. The changeover operation is the same as the above-described operation for changeover from the recording sheet 49 side to the rewritable film 55 side. In this case, however, the head fixing base 56 moved to the left by the rotation of the cam 59 is rotated clockwise to the predetermined position.

After the thermal head 50 has been set in the desired position, an image signal received through the telephone line and demodulated by the modem 62 is decoded into an image by the decoding section 63. A desired recording signal of this image is formed by the recording circuit 66, and the image is recorded on the recording sheet 49 or the rewritable film 55 by the thermal head 50.

It is also possible to perform the same copying operation of the convention facsimile apparatus, i.e., the operation of directly recording an image read by the close-contact type image sensor 47. Needless to say, rewritable film 55 can be used as a recording medium for this operation.

Figure 6:
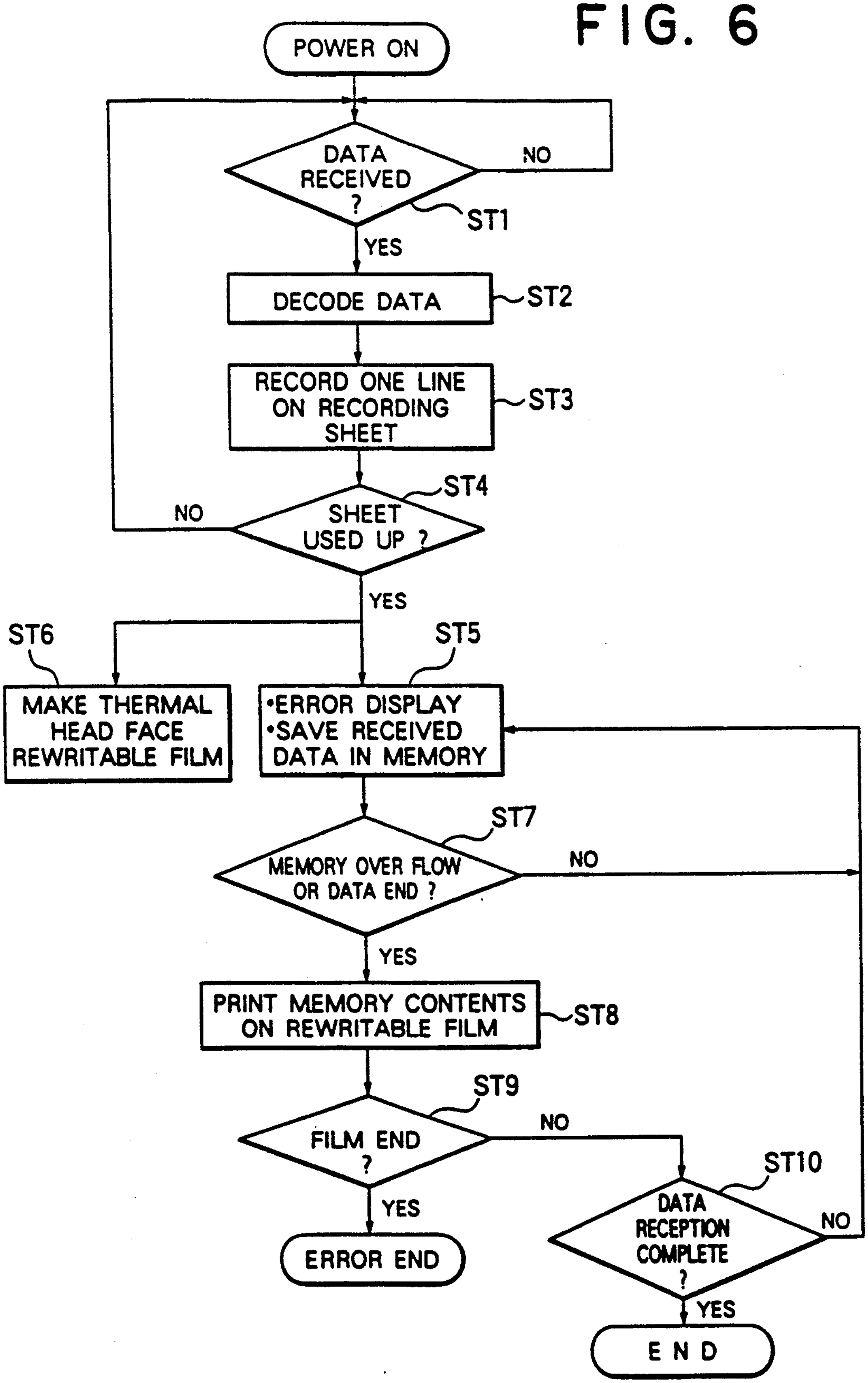
FIG. 6 is a flow chart of an example of the operation of the facsimile apparatus shown in FIG. 4.

If a memory overflow occurs when received image signals are stored in the memory 64, received images can also be recorded on the rewritable film 55. The operation relating to this case will be described below with reference to the flow chart of FIG. 6.

First, the thermal head 50 is previously set at the recording sheet 49 side. When there is some recording sheet 49, received images are recorded on recording sheet 49 (Steps ST1 to ST3). If a situation occurs where no recording sheet 49 is supplied and where recording on recording sheet 49 cannot be performed (step ST4), the control circuit 61 effects an error display in the operation panel 43. Also, received image signals are transferred from the modem 62 to the memory 64 and are stored in the memory 64 by an instruction from the control circuit 61 (step ST5). If the reception is continued under this condition and if the amount of image signal exceeding the capacity of the memory 64 is received, a memory overflow occurs. In such an event, the reception is necessarily stopped in the case of the conventional facsimile apparatus.

However, the facsimile apparatus of this embodiment is capable of recording on the rewritable film 55. That is, when the recording sheet 49 provided is used up, the image signal output destination is changed to the memory 64 and the thermal head 50 is simultaneously moved to the rewritable film 55 side (step ST6). At the time of occurrence of an overflow, the control circuit 61 operates to output the images stored in the memory 64 to the thermal head 50 (steps ST7, ST8). Since the thermal head 50 is in close contact with the rewritable film 55, the received images are recorded on the rewritable film 55. Image signals thereafter received are successively stored in addresses of the memory from which image signals have been output. When the end of the rewritable film 55 is reached, the reception is stopped (step ST9). The operation of these steps is repeated until the reception is normally finished (step ST10). If the reception is normally finished without any memory overflow, the decoding section 63 starts decoding the image signals stored in the memory 64 at the time when the reception is finished. The corresponding images are thereby output to the thermal head 50 through the recording circuit 66. Consequently, received images which are not recorded on the recording sheet 49 are recorded on the rewritable film 55.

If the apparatus is arranged without memory 64, the position of the thermal head 50 is changed over to the rewritable film 55 side when the reception of a certain page is finished and immediately before recording sheet 49 is used up. (A situation where recording sheet 49 is nearly used up can be previously detected in ordinary facsimile apparatuses). The next and succeeding pages of received images can be recorded on the rewritable film 55.

It is also possible to use the apparatus in such a manner that received images are recorded as a reference on the rewritable film 55, and that the user confirms the images on the rewritable film 55 and records necessary pages on the recording sheet 49. In this case, the thermal head 50 is previously set on the rewritable film 55 side. Received image signals are supplied from the modem 62 to the memory 64 to be stored therein. Simultaneously, the received image signals are decoded into images by the decoding section 63, and these images are reduced to ¼ by the reduction circuit 65. The reduced images are maintained in the reduction circuit 65 together with page numbers. When four pages of image are received or the reception is finished, the reduction circuit 65 outputs the images to the thermal head 50 through the recording circuit 66. Four pages of reduced images are thereby recorded on the rewritable film 55. All these operations are controlled by the control means 61.

Next, the user inputs the page numbers of necessary pages through the operation panel 43 by referring to the images on the rewritable film 55. The control circuit 61 outputs an instruction to move the thermal head 50 to the recording sheet 49 side, receives the input page numbers and the image signals corresponding to the input page numbers from the memory 64 to the decoding section 63. The decoding section 63 decodes the image signals to obtain images and outputs the decoded signals to the thermal head 50 through the recording circuit 66. Since the thermal head 50 has been set on the recording sheet 49 side, the necessary images of the original size are recorded on the recording sheet 49. After the recording of the necessary images has been completed, the record on the rewritable film 55 are erased.

The method of erasing the record on the rewritable film 55 will be described below. When the record on the rewritable film 55 becomes unnecessary, the user inputs an erasing instruction through the operation panel 43. The control circuit 61 outputs an instruction to move the thermal head 50 to the rewritable film 55 side in response to the erasing instruction or automatically while no erasing instruction is supplied. The thermal head 50 is thereby brought into close contact with the rewritable film 55. The control circuit 61 then outputs an instruction to the recording circuit 66 to energize the thermal head 50 to heat the rewritable film 55 at a temperature lower than the recording heating temperature. Simultaneously, the control circuit 61 rotates the roller 53 to cause the color extinguishing reaction while moving the rewritable film 55, thereby erasing the images on the rewritable film 55 with respect to all lines.

The operation during transmission is the same as the conventional facsimile apparatus and therefore will not be described.

In the above-described embodiment, recording on the rewritable film 55 and the recording sheet 49 and erasing of images on the rewritable film 55 are performed with one thermal head 50. Alternatively, a thermal head for the rewritable film 55 and another thermal head for the recording sheet 49 may be provided separately from each other. The same effects as the above-described embodiment can also be achieved by this arrangement. In this case, there is no need for the head changeover mechanism, and the recording sheet 49 is not limited to the thermal recording sheet. That is, the ordinary recording sheet for recording with an electrophotography system using laser or LEDs can also be used. Further, a recording head and an erasing head may be provided separately for the rewritable film 55.

In the above-described embodiment, rewritable film 55 is used after an overflow of memory 64 has occurred. Alternatively, rewritable film 55 may be used for ordinary recording and recording sheet 49 may be used at the time of occurrence of an overflow.

The rewritable film 55 of the embodiment is of an endless belt type as shown in FIG. 4. Alternatively, a type of rewritable film to be wound around one platen may be used.

Thus, in the above-described embodiment, 1) recording can be performed in the same manner as the ordinary facsimile apparatus.
2) data can be recorded on rewritable film 55 when recording sheet 49 is used up,
3) data can be recorded on rewritable film 55 alone, or
4) data is recorded on rewritable film 55 and only necessary data can be recorded on recording sheet 49.

EMBODIMENT 4

This embodiment will be described below in further detail. The control means for selecting recording sheet 49 or rewritable film 55 as a recording medium has three functions: a first function of setting the heating means (thermal head 50) in the desired position, a second function of controlling the energy (thermal energy) applied by the heating means, and a third function of controlling the operation when reduced images are recorded on rewritable film 55.

Figure 7:
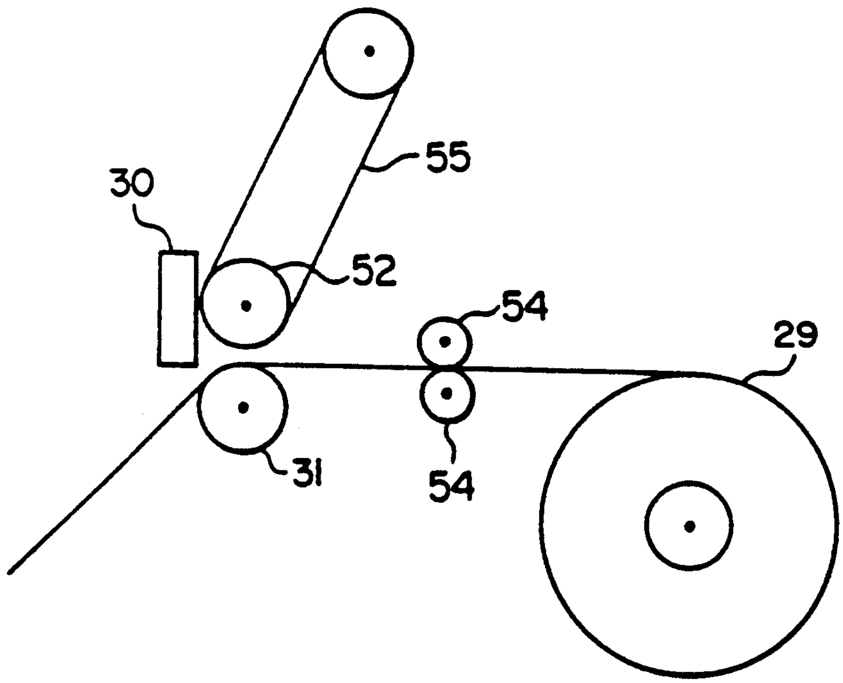
FIG. 7 is a schematic illustration of essential components of a facsimile apparatus in accordance with a fourth embodiment of the present invention.
Figure 8:
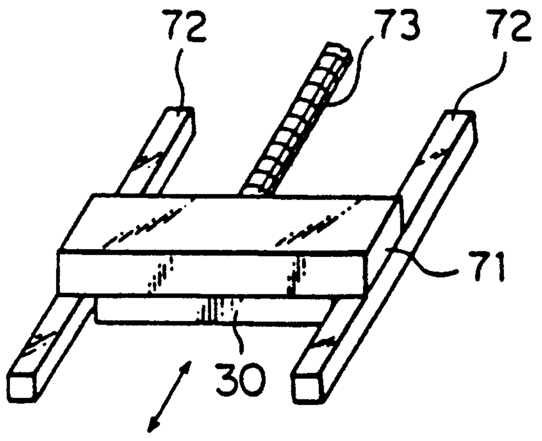
FIG. 8 is a perspective view of the slide mechanism of the facsimile apparatus shown in FIG. 7.

In the apparatus shown in FIG. 4, the head fixing base 56, the support rod 57, the spring 58 and the cam 59 are arranged to rotate the thermal head 50 and to record or erase data on or from recording sheet 49 and rewritable film 55 by the same thermal head 50. However, the arrangement may alternatively be such that the thermal head 50 is slid in a vertical direction as viewed in FIG. 7 (in which only essential components are shown). As shown in FIG. 8, the slide mechanism may be constituted by, on the reverse side of the thermal head 50, a head support 71, rails 72 disposed parallel to the head support 71, and a rotary support rod 73 connected directly or indirectly to a motor or the like (not shown). In FIG. 8, the vertical movement of FIG. 7 is shown as a horizontal movement for convenience' sake. The thermal head 50 is moved as described below. To effect recording on rewritable film 55, the unillustrated motor is rotated by an instruction from the control means 61 through the motor drive circuit 67 to rotate the motor rotated support rod 73 counterclockwise. The thermal head 50 fixed on the head support 71 is thereby moved frontward and is set in the position designated by the instruction from the control means 61. A mechanism for pressing the thermal head 50 may be provided on the head support 71. To effect recording on recording sheet 49, the thermal head 50 is moved rearward in the same manner by an instruction from the control means 61.

Figure 9:
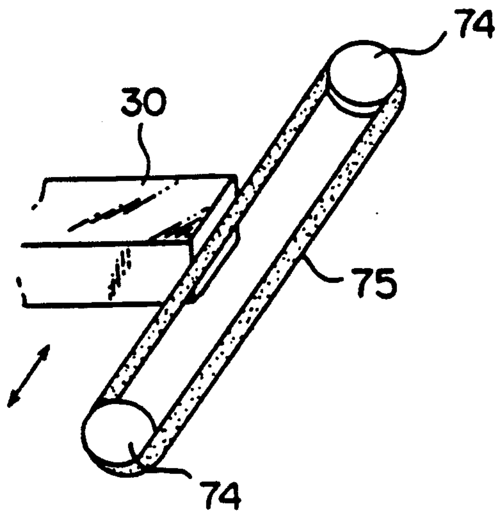
FIG. 9 is a perspective view of the thermal head and the belt of the facsimile apparatus shown in FIG. 7.
Figure 10:
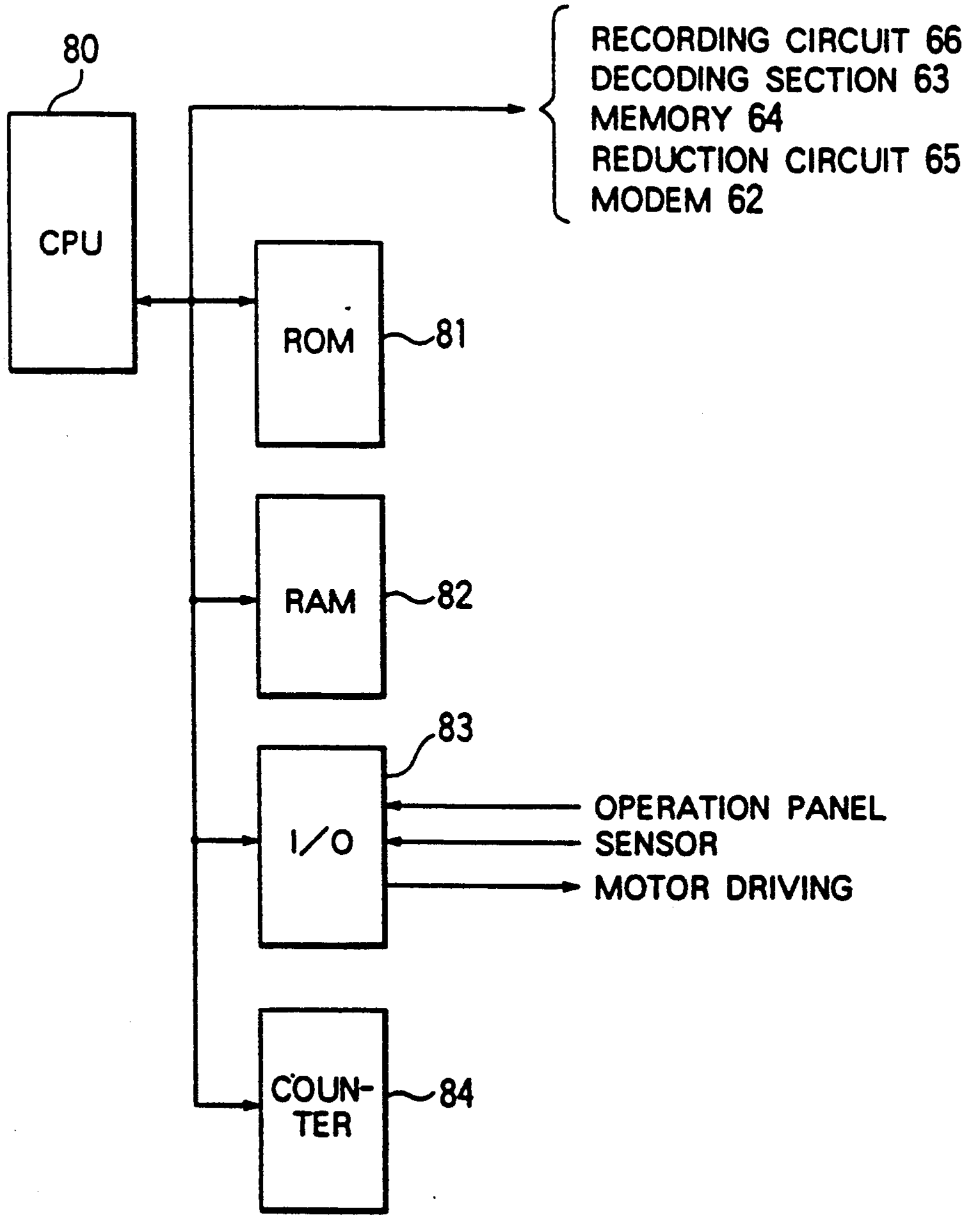
FIG. 10 is a block diagram of the control circuit of the facsimile apparatus shown in FIG. 7.

Another arrangement such as that shown in FIG. 9 is possible in which thermal head 50 is bonded to a belt 75 formed of a metal, rubber or the like, and the belt 75 is wrapped around rollers 74 rotated by being driven by an unillustrated motor and is moved in a horizontal direction (or vertical direction as viewed in FIG. 7). This movement is controlled by instructions from the control means 61. The control means 61 is constituted by, for example, as shown in FIG. 10, a CPU 80 for control of control means 61 or a control circuit board 22, a ROM 81 in which the contents of the operation are stored, a rewritable RAM 82, an I/O interface 83 through which signals from the operation panel or a sensor are input and through which motor driving signals are output, a counter 84 for controlling the recording time and the motor rotation time, and other components, whereby the above-mentioned operation is performed. The control means 61 may include, along with the arrangement of FIG. 10, a means for selecting the recording medium and for moving a heating means such as thermal head 50.

Figure 11:
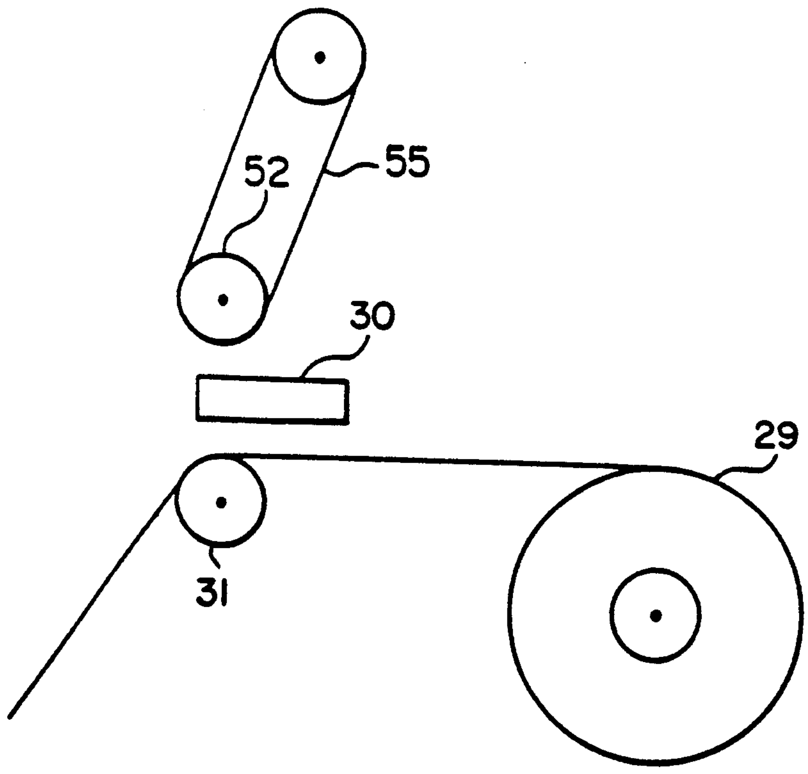
FIGS. 11 to 17 are schematic illustrations of essential components of facsimile apparatuses in accordance with the present invention.

In still another possible arrangement such as that shown in FIG. 11, thermal head 50 is placed between roller 52 on the rewritable film 55 side and platen roller 51 on the recording sheet 49 side, 1. In this case, the thermal head 50 has a construction such that heating elements are arranged on both its upper and lower sides, and can be moved relative to the roller 52 or the platen roller 51 by the same cam 59 (not shown) as that shown in FIG. 4, a motor or a system to which the principle of the lever is applied (both not shown).

Figure 12:
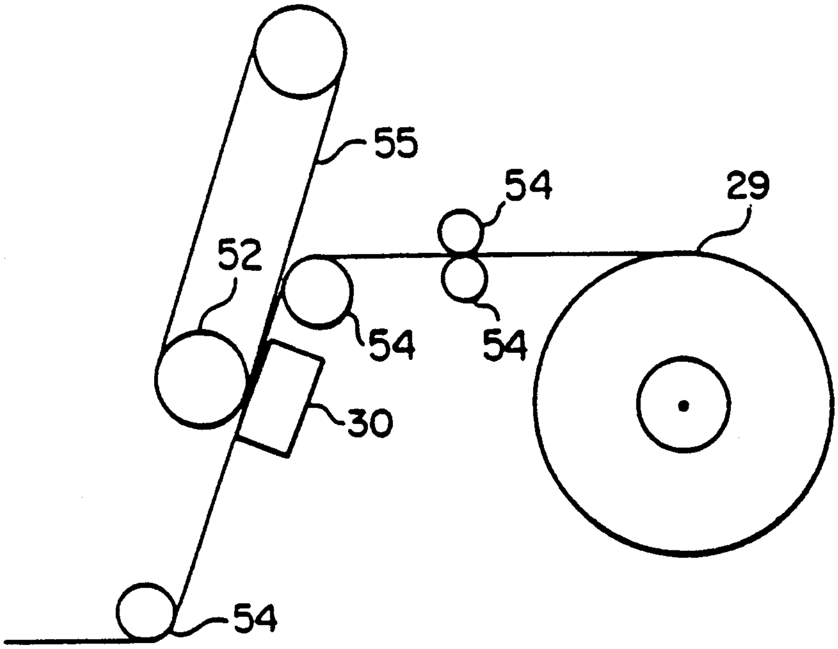
Figure 13:
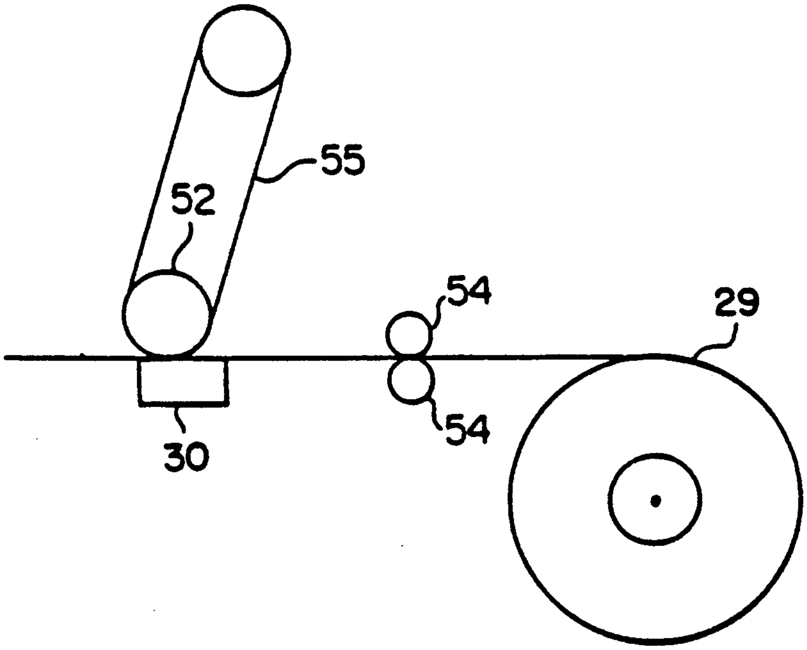

There are further possible arrangements such as those shown in FIGS. 12 and 13, wherein thermal head 50 is not moved. In the case of these arrangements, the contents of the operation instructed by the control means differ from those described above. That is, the operation is the same as that described above at the time of recording on recording sheet 49, but the operation for recording on rewritable film 55 is different. This is because recording sheet 49 is inserted between rewritable film 55 and the thermal head 50 so that recording on rewritable film 55 is obstructed. The contents of instructions from the control means 61 are therefore such that at the time of recording or erasing on the rewritable film 55, the recording sheet 49 is wound up clockwise to be returned to the platen roller 54 (right roller 54) so that the rewritable film 55 and the thermal head 50 can be brought into direct contact with each other.

Figure 14:
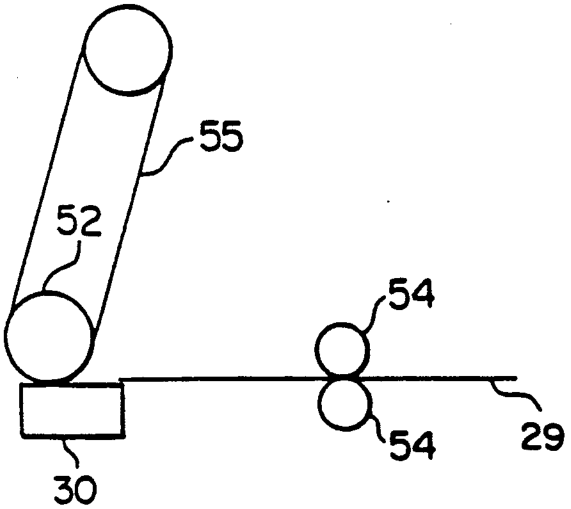
Figure 15:
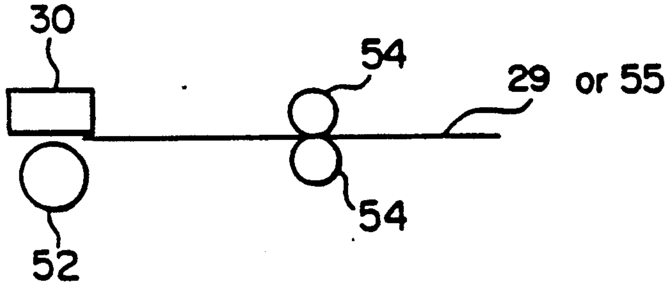
Figure 16:
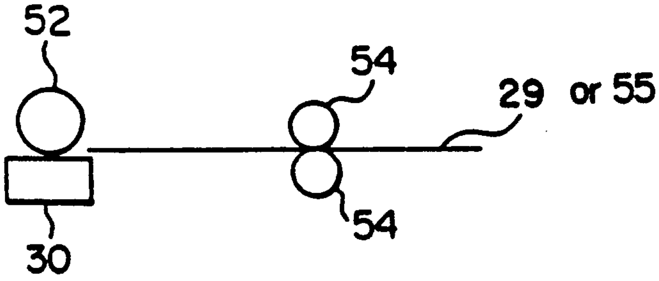

There are still further possible arrangements, such as that shown in FIG. 14, wherein cut sheets provided as recording sheet 49 can be used without moving thermal head 50, and those shown in FIGS. 15 and 16, wherein cuts sheets of rewritable film 55 and cut recording sheets 49 can be used. For these arrangements, the energy (thermal energy) applied from the heating means is controlled (in a manner described later). In such a case, rewritable film 55 or recording sheet 49 is selected through operation panel 43 by supplying information on the selection to the control means, or a command is set from an interface unit (e.g., a central interface) connected to the rewritable recording apparatus and information thereon is supplied to the control means 61.

Figure 17:
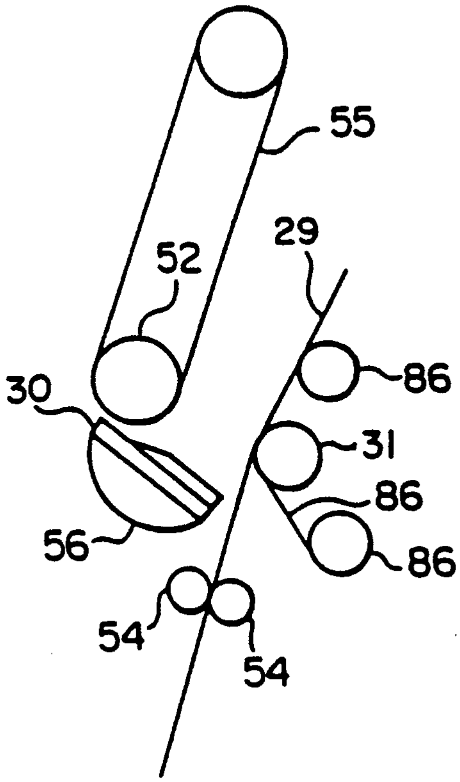

It is also possible to effect thermal transfer recording and rewritable recording by a common means as shown in FIG. 17. However, ordinary paper is used as recording sheet 49, and an ink ribbon 86 is used. The operation of this arrangement is generally the same as the above-described operation.

Figure 18:
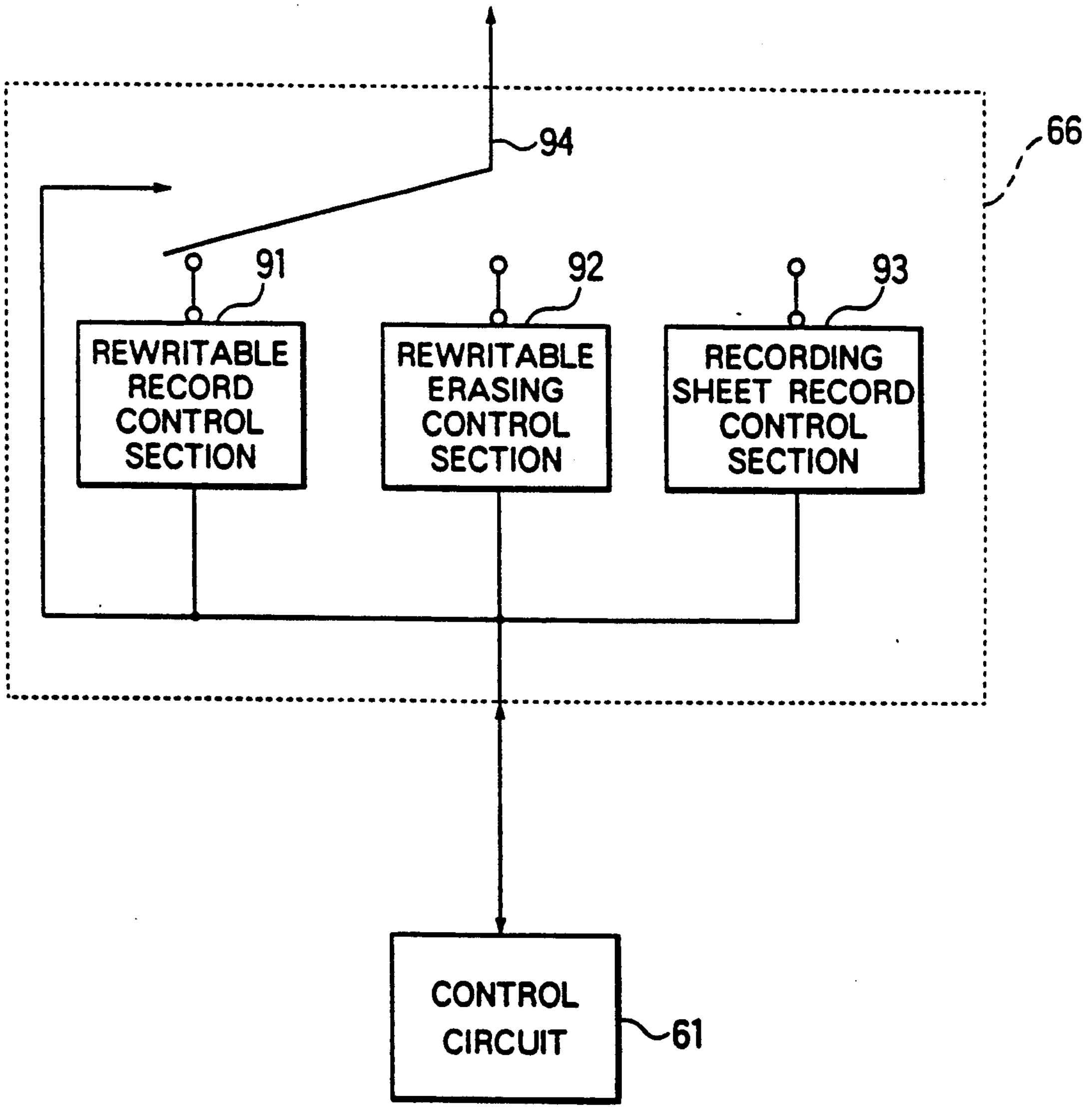
FIG. 18 is a block diagram of the recording circuit of the facsimile apparatus shown in FIG. 7.

The control of the energy (thermal energy) applied by the heating means will now be described below. FIG. 18 shows control means 61 and recording circuit 66. Recording circuit 66 is constituted by a rewritable recording control section 91, a rewritable recording erasing control section 92, a recording sheet record control section 93, and a selector 94. Tables of energy for heating thermal head 50 are stored in the control sections 91 and 93. To heat the thermal head 50, one of these control sections is connected to the thermal head 50 by an instruction from the control means 61.

Figure 19:
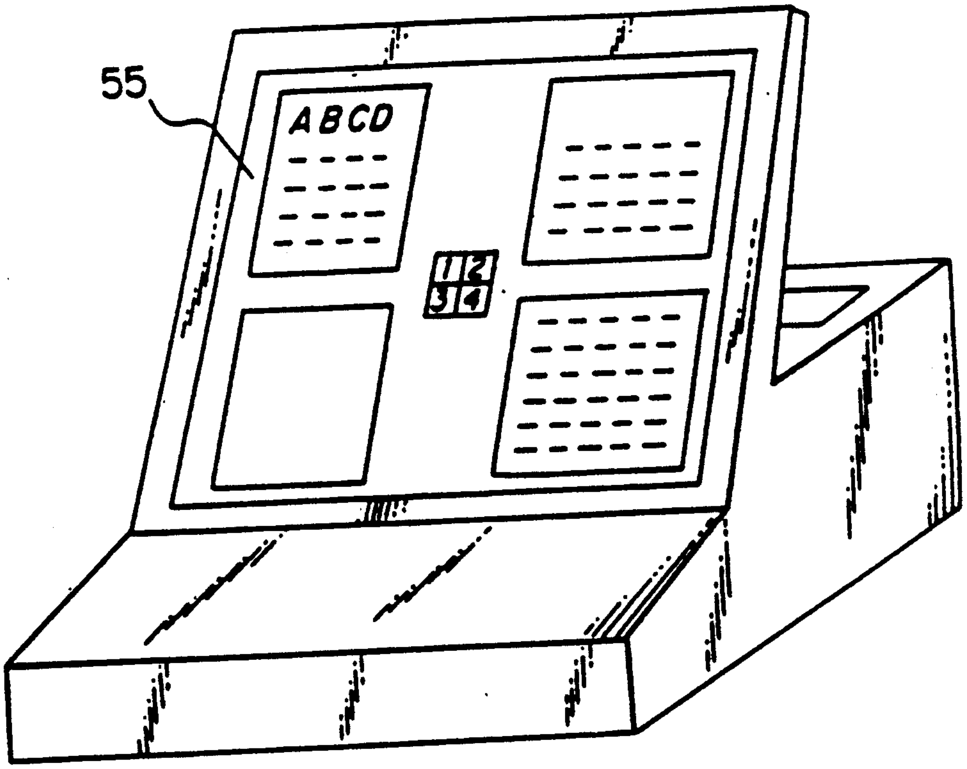
FIG. 19 is a perspective view of an example of reduced display on the rewritable recording film of the facsimile apparatus shown in FIG. 7.

FIG. 19 shows an example of the facsimile apparatus in which rewritable film 55 is used as a referential means, and in which received images are reduced and recorded on rewritable film 55. The received images may be recorded without being reduced. However, if the resolution of the thermal head 50 is set to 6 lines or, more preferably, 12 lines per millimeter, it is possible to view reduced images or characters to determine whether they are necessary or unnecessary. They can be recorded on the recording sheet if there is a need to store them. In the example shown in FIG. 19, numerals shown at the center of the screen represent page numbers, and corresponding data can be recorded on the recording sheet by inputting these numbers through the operation panel. The reduction method for the reduction circuit shown in FIG. 5 can be provided as, for example, a method of thinning out image data to half of a reduction method based on perspective.

According to the present invention, as described above, the recording medium can be selected, images are recorded on the rewritable film, and only final images or necessary images can be recorded on the recording sheet, thereby enabling a reduction in running cost. The facsimile apparatus is designed to enable received images to be automatically recorded on the rewritable film when the recording sheet is used up, thereby reducing the possibility of reception interruption. Reduced images can be formed on the rewritable film by the control means, and it is possible to easily read a document during proofreading to change and elaborate sentences thereof without reducing the document on the recording sheet.

With respect to the embodiments of the present invention, facsimile apparatuses have been described. However, the present invention is not limited to them and can be applied to various kinds of recording/display apparatus. Also, they can be changed in various ways. For example, in the case of a recording apparatus such as a word processor, modem 62 and decoding section 63 shown in FIG. 5 are not necessary.

In the embodiment shown in FIG. 4, thermal head 50 is rotated by cam 59. However, the same performance can be achieved if it is rotated by a motor or the like.

The arrangement in which recording on the rewritable film 55 and the recording sheet 49 and erasing of images on the rewritable film 55 are performed with one thermal head 50 has been described. Alternatively, a thermal head for the rewritable film 55 and another thermal head for the recording sheet 49 may be provided separately from each other. The same effects as the above-described embodiment can also be achieved by this arrangement. In this case, there is no need for the head changeover mechanism. With respect to the above described embodiment, an example of the recording method using thermal head 50 is adopted. However, the ordinary recording sheet used for recording by a recording method using laser or LEDs or by ink jet recording can also be used. Further, a recording head and an erasing head may be provided separately for rewritable film 55.

In the above-described embodiment, rewritable film 55 is used after an overflow of memory 64 has occurred. Alternatively, rewritable film 55 may be used for ordinary recording and recording sheet 49 may be used at the time of occurrence of an overflow.

The rewritable film 55 of the embodiment is of an endless belt type as shown in FIG. 4. Alternatively, a type of rewritable film to be wound around one platen may be used.

EMBODIMENT 5

Figure 20:
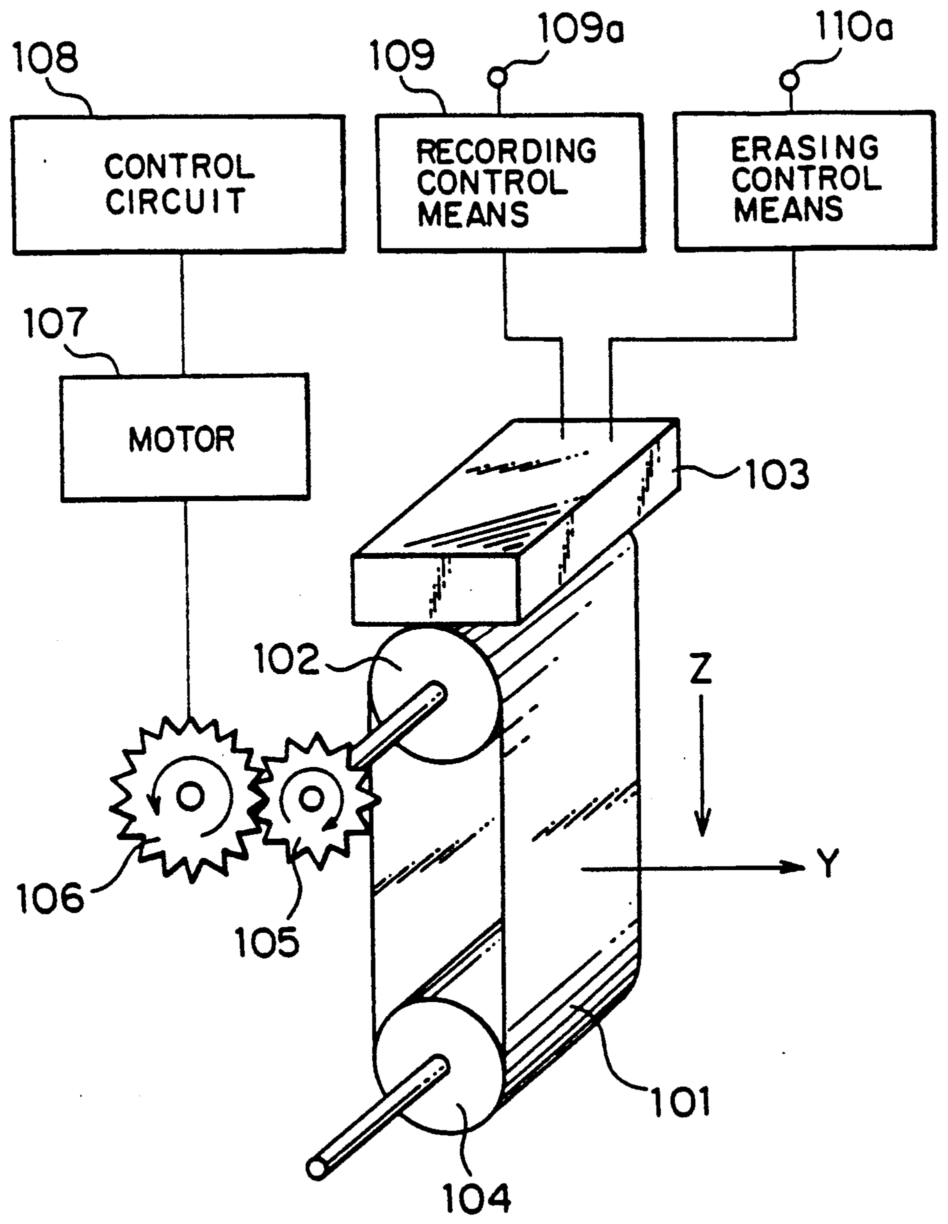
FIG. 20 is a schematic diagram of the construction of a rewritable recording/display apparatus in accordance with a fifth embodiment of the present invention.

FIG. 20 is a schematic diagram of the construction of a rewritable recording apparatus using a rewritable film. A recording film 101 which is repeatedly rewritable is supported by a platen roller 102 and a roller 104 while being suitably tensed. The platen roller 102 and a thermal head 103 are maintained in contact with each other by a pressure. The thermal head 103 having a plurality of heating elements (not shown) has the functions of heating means for applying first energy and second energy. The platen roller 102 which serves to feed the rewritable recording film 101 is driven by a motor 107 through gears 105 and 106. The motor 107 is controlled by a control circuit 108. A recording control means 109 outputs an image signal according to a desired display image input through a data terminal **109*a* to generate heat in the thermal head 103 by the first thermal energy. An erasing control means 110 outputs an image erasing signal according to a desired erasing range input and designated through an erasing data terminal 110*a* to generate heat in the thermal head 103** by the second thermal energy.

A colored (monochromatic, e.g., blue) image is formed on the rewritable recording film 101 by applying the first thermal energy ($h_1$) from the thermal medium, i.e., the thermal head 103 to the film 101. This image has a memory property in an ordinary environment (temperature, humidity). The image can be erased by applying the second thermal energy ($h_2$) to the film 101. Thus, the recording film 101 is repeatedly erasable.

Figure 22:
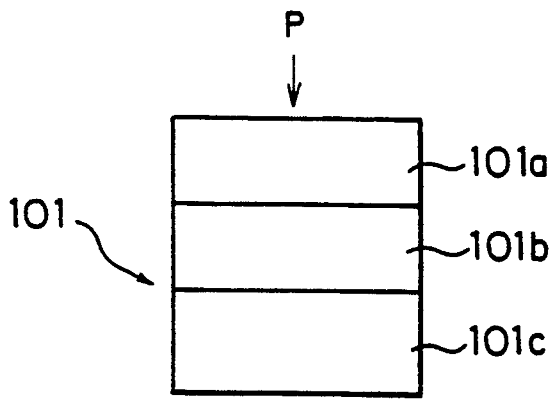
FIG. 22 is a schematic diagram of the rewritable recording film.

The structure of the rewritable recording film 101 is, for example, as shown in FIG. 22. The rewritable recording film 101 has a protective layer **101*a* for improving the durability of the film, a recording layer 101*b* formed of a dyestuff, a color developing/reducing agent, a binder and other materials, and a base 101*c***. For example, the first thermal energy ($h_1$) is applied for a short period of time (about 1 to 3 msec) at a high temperature (about 200° to 350° C.) to form an image, and the second thermal energy ($h_2$) is applied for a long time (about 5 msec to 2 sec) at a low temperature (about 80° to 150° C.) to erase the image.

The operation of this rewritable recording apparatus will be described below.

The rewritable recording film 101 is driven by the motor 107 through the drive transmission mechanism, i.e., including the first and second gears 105 and 106.

The rewritable recording film 101 is moved in the direction of arrow Z with the rotation of the platen roller 102 by virtue of friction with the platen roller 102 and the thermal head 103. When supplied with a recording signal through the recording data terminal 109*a*, the recording control means 109 causes a current to flow through the thermal head 103 by predetermined timing. The heating elements (not shown) are thereby heated to develop a color in the rewritable recording film 101 (which operation is the same as forming an image).

After color development for one line has been completed, the drive means feeds the recording film 101 in the direction of arrow Z by one line, and color development is effected by the same operation.

This operation is repeated to form a two-dimensional image on the rewritable recording film 101. The extent to which the film is fed for one line (hereinafter referred to as "pitch") corresponds to the resolution of the thermal head 103. (For example, if the heating elements are disposed at 6 elements/mm, the pitch is about 167 $\mu$m).

Figure 21:
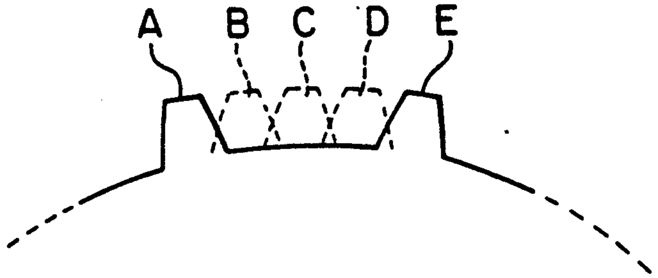
FIG. 21 is a schematic enlarged view of a gear of the rewritable recording/display apparatus shown in FIG. 20.

This pitch is set as shown in FIG. 21. When, for example, a signal of 4 pulses/line is supplied form the control circuit 108, the first gear 105 and the second gear 106 are driven as A→B→C→D→E to feed the platen roller 102 and the rewritable recording film 101 in the direction of arrow Z. The image forming operation (color developing operation) is thus performed. The viewer can view the image in the direction of arrow Y.

Next, the operation of erasing images formed on the rewritable recording film 101 will be described below.

To erase images, the erasing control means 110 makes the heating elements of the thermal head 103 in the desired erasing range generate heat to extinguish the color (which operation is the same as erasing images). At this time, the time for energization of the thermal head 103, the applied voltage, or the energization pulses are controlled to set the second thermal energy ($h_2$) to the thermal head 103 so that the temperature of the heating elements is lower (e.g., 80° to 150° C.) than that at the time of color development using the first thermal energy ($h_1$), and so that pulses for energization of the thermal head 103 are longer (e.g., 5 msec to 2 sec).

As described above, the thermal head 103 has the two functions based on the control of the recording control means 109 and the erasing control means 110, thereby enabling a reduction int he overall cost of the apparatus.

The recording control means 109 and the erasing control mans 110 are provided separately from each other in this embodiment. However, the same performance can also be achieved in a case where they are combined into a recording/erasing means.

According to an erasing method of the present invention, the thermal head 103 is moved by a one-line pitch equal to or smaller than that at the time of color development (recording). The one-line pitch corresponds to recording of one line at the time of color development, or erasing of one line at the time of color extinction. Color extinction can be effected at a high speed although some amount of colored portion remains, if the color extinguishing pitch is equal to the color developing pitch, or the color on the rewritable recording film 101 can be completely extinguished if the color extinguishing pitch is smaller than the color developing pitch.

The pitch by which the rewritable recording film 101 is fed is reduced by, for example, outputting a signal of 2 pulses/line from the control circuit 108 to the motor 107 (which pulse internal is half of that at the time of color development). The rewritable recording film 101 on the platen roller 102 driven by the motor 107 through the drive transmission mechanism consisting of the first and the second gears 105 and 106 is thereby fed int he direction of arrow Z by a pitch which is half of the color developing pitch. This state of feeding is as indicated by A→B→C in FIG. 21, i.e., a half-pitch driving, and one line at the time of color development corresponds to two lines at the time of color extinction. All image patterns on the rewritable recording film 101 can therefore be erased.

According to the results of experiments made by the inventor, all the heating elements of the thermal head 103 may be heated by the second thermal energy ($h_2$), and, to completely extinguish the color, heating all the heating elements at the time of color extinction is most effective.

Figure 23:
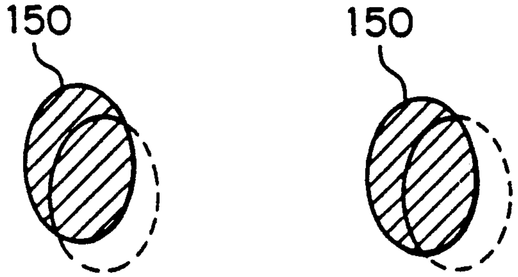
FIG. 23 is a diagram of the operation of erasing on the rewritable recording film.
Figure 24:
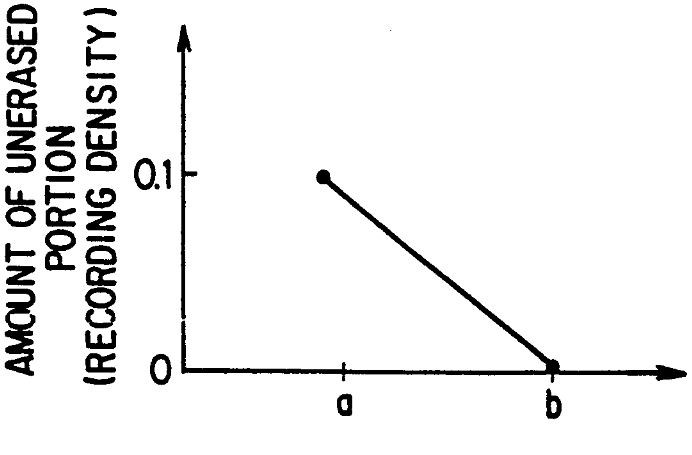
FIG. 24 is a graph of the relationship between pixels shown in FIG. 23 and the amount of unerased portion.

This is because if the heating elements are heated with the same heating pattern as color development, the positions of the color developed pixels an the heating elements are shifted from each other as shown in FIG. 23 so that some colored parts 150 are left. In FIG. 23, the hatched circle represents a color-developed pixel while the broken line circle represents an erased pixel. FIG. 24 shows comparison between the amount of colored portion (represented by a) remaining after erasing effected by heating the heating elements with the same heating patterns as color development and the amount of colored portion (represented by b) remaining after erasing effected by heating all the heating elements. The operation of the apparatus is such that the drive signals supplied from the erasing control means 110 to the thermal head 103 are selected so as to heat up all the heating elements of the thermal head 103, and that the color extinguishing operation is performed while moving the rewritable recording film 101 in the direction of arrow Z simultaneously with the platen roller 102. According to the above explanation, a signal is applied so as to energize all the heating elements of the thermal head 103. However, a signal may be applied to energize the heating elements in a range such that the erasing area is larger than the recording area. That is, in the case of recording on a small area (e.g., an area half that of the thermal head) such as recording on a card for displaying the balance at the bank, the thermal head may be energized for erasing so that the erasing area is larger than the recording area (e.g., set to ¾ of that of the thermal head), that is, the thermal head is energized within the desired range.

Another erasing method of the present invention has been provided by noticing and experimentally confirming that the heating temperature can be maintained generally constant is a plurality of high-frequency energization pulses are applied instead of applying one energization pulse for one line as in the case of the conventional apparatus.

Figure 25:
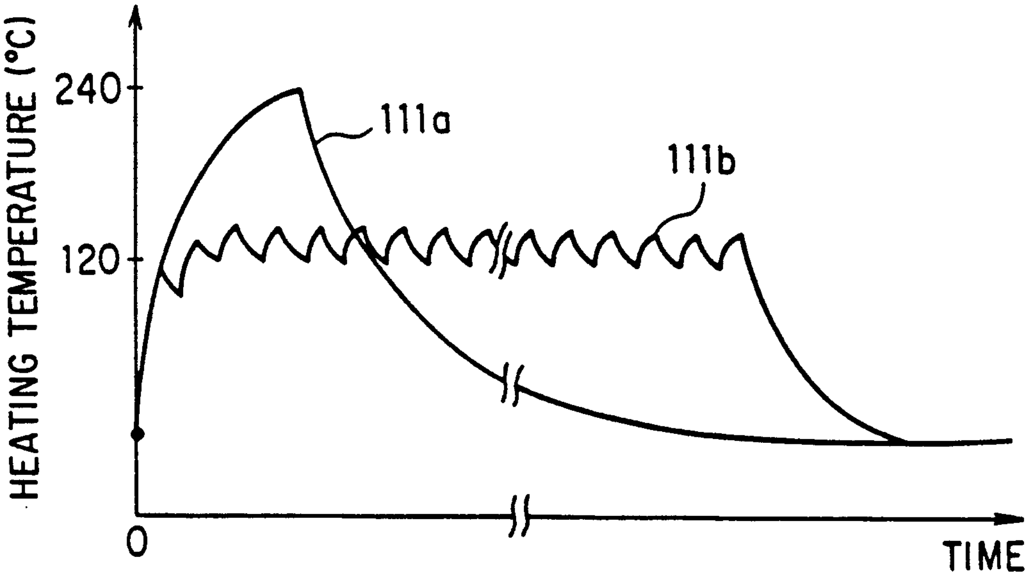
FIGS. 25 and 29 are graphs of the change in the thermal head heating temperature with respect to time.
Figure 26:
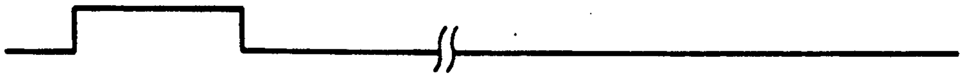
FIG. 26 is a diagram of recording energization pulses.
Figure 27:
FIG. 27 is a diagram of erasing energization pulses.
Figure 28:
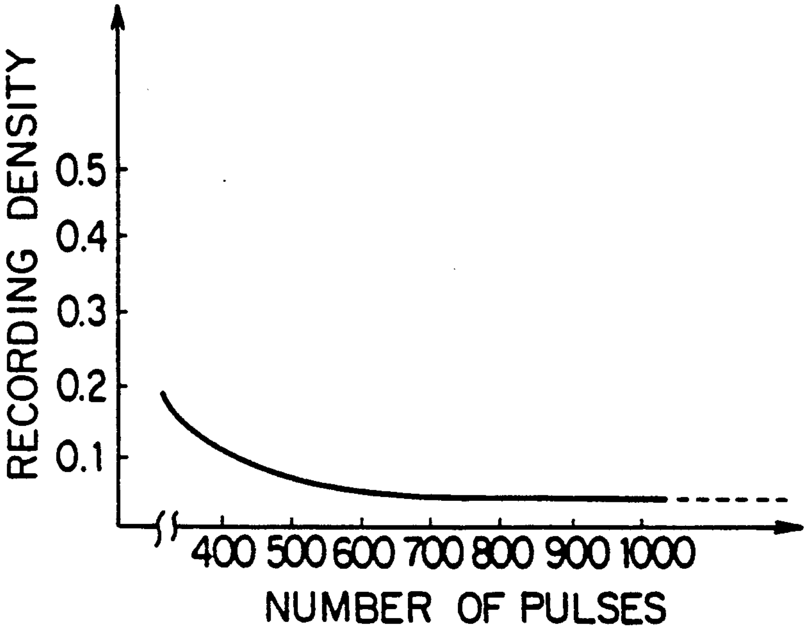
FIG. 28 is a graph of the relationship between the number of pulses and the recording density.

While data recorded on the rewritable recording film 101 can be erased by the application of the second thermal energy ($h_2$) at about 120° C. for 5 msec to 2 sec, the heating element temperature can be maintained at a generally constant level by repeating switching of high-frequency energization pulses, as shown in FIG. 25. In FIG. 25, a line 111*a* indicates the relationship between the heating temperature and time when recording energization pulses (FIG. 26) are applied, and a line 111*b* indicates the relationship between the heating temperature and time when erasing energization pulses (FIG. 27) are applied.

According to the experiments made by the inventor, erasing can be performed completely even by the thermal head if 500 to 100 pulses having 10 μsec on and off periods are applied (the temperature of the heating elements being maintained at about 120° C.). These values may be changed according to the constituent materials of the rewritable recording film 101. For example, the optimum erasing temperature is 100° C., both the on and off times of energization pulses are set to 9 μsec, or the time is set to 8 μsec while the off time is set to 10 μsec. In any case, it is possible to limit the rate at which the temperature of the heating elements changes and to effect complete erasure in practical use.

Figure 29:
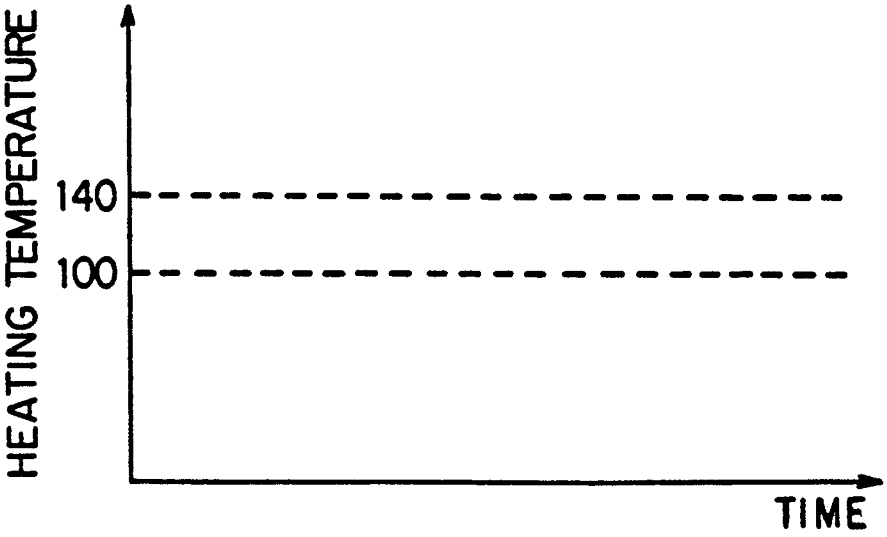
Figure 30:
FIGS. 30 to 32 are diagrams of energization pulses.
Figure 31:
Figure 32:

The waveform of energization pulses may be determined so that the heating temperature is set to, for example, 100° to 140° C., as shown in FIG. 29. The pulse length may be determined so that the on time is long (about 100 μm) while the off time is longer than the on time (about 150 μm), as shown in FIG. 30. Energization pulses such as those shown in FIG. 31 having on and off times of 5 μsec, or energization pulses formed by changing each of the on and off times every other pulse as shown in FIG. 32 may also be used. For erasing, a process of applying a plurality of erasing energization pulses for one line, thereafter feeding the film, and applying a plurality of energization pulses again is repeated to complete erasing of one frame. A plurality of energization pulses may be applied while feeding the film to erase one line, and this operation may be repeated to complete erasing of one frame.

Figure 33:
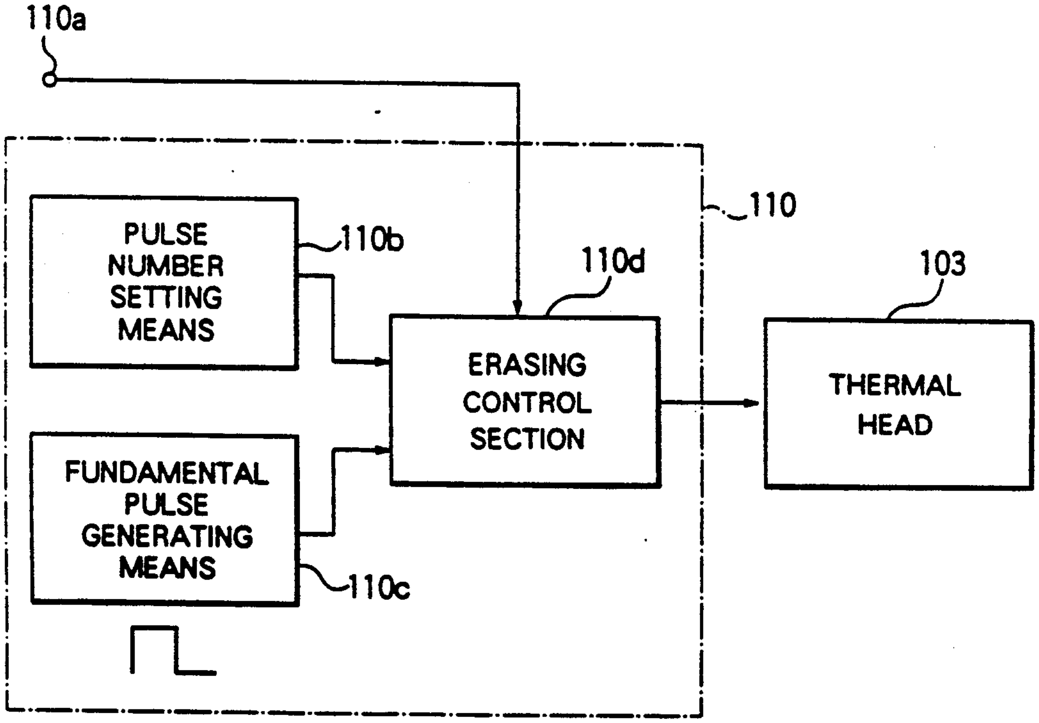
FIG. 33 is a block diagram of the erasing control section of the fifth embodiment.

FIG. 33 shows blocks of an erasing control section 110 for realizing this erasing method. A fundamental pulse generation means **110*c* generates one of pulses such as those shown in FIGS. 30, 31, and 32. Signals output from the fundamental pulse generation means 110*c* and a pulse number setting means 110*b* for setting the number of pulses to be generated, and data input through an erasing data terminal 110*a* are supplied to an erasing control section 110*d*. The erasing control section 110*d* forms a plurality of energization pulses from the signals sent from the fundamental pulse generation means 110*c* and the pulse number setting means 110*b*, and transfers and applies the erasing data and the erasing energization pulses to the thermal head 103** to erase one line of a formed image. After the completion of erasing of one line, the film is fed by one line, and the same erasing operation is repeated.

In the above-described embodiment, a pulse motor is used as the motor 107 of the driving means. However, use of a DC motor or an AC motor also ensures the same effect. Also, the arrangement of the first and second gears 105 and 106 is not limited to that described above.

In the above-described embodiment, color development and color extinction are effected with the same thermal head 103. The same effect can also be obtained by separating it into a color developing thermal head **103*a* disposed on the platen roller 102 side and a color extinguishing thermal head 103*b* disposed on the roller 104** side.

Figure 34:
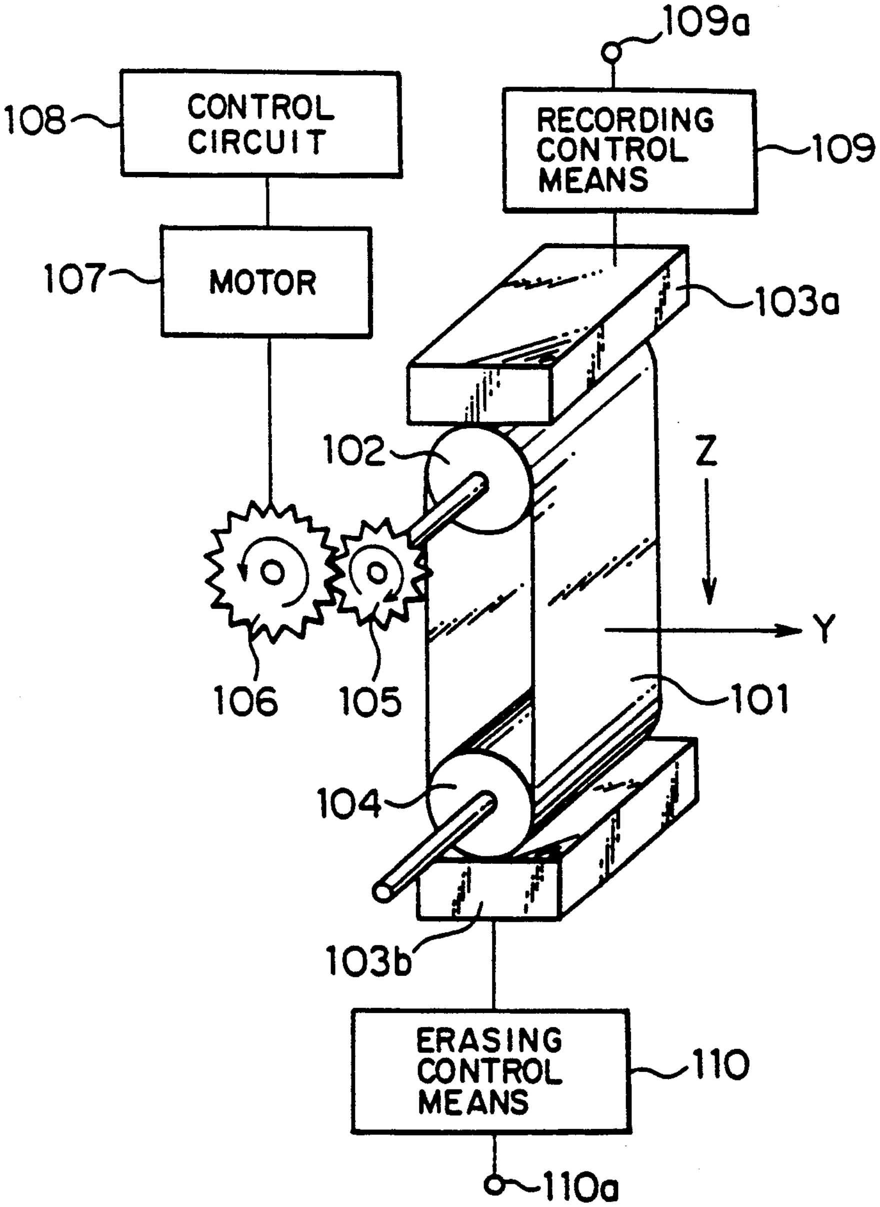
FIG. 34 is a schematic diagram of the construction of a rewritable recording/display apparatus in accordance with a further embodiment of the present invention.

In this case, there is no need to return or rotate the rewritable recording film 101 to the position of the thermal head 103, which operation is required in the arrangement shown in FIG. 20. It is thereby possible to effect erasing at a high speed. The positions of the color developing thermal head **103*a* and the color extinguishing thermal head 103*b* can be changed. For example, the color extinguishing thermal head 103*b* may be positioned in front of the color developing thermal head 103*a*, and other various modifications are possible without departing from the scope of the invention set forth in the claims. Further, in a case where a heating means, e.g., the thermal head 103*a* shown in FIG. 20, having both the recording and erasing functions is separated into two disposed at upper and lower positions as shown in FIG. 34, recording or erasing can be performed simultaneously at two positions, and the recording film can therefore be viewed in two directions, that is, an area facing in a direction Y and another area facing the direction opposite to the direction Y can be viewed. In this case, recording at the upper portion and recording at the lower position may be performed alternately since a large capacity power source is required if recording or erasing is performed simultaneously. It is also possible to effect erasing at the upper position and recording at the lower position. In this case, image information can be read on the side opposite to the side Y alone. In the above-described arrangement, the direction in which the rewritable recording film 101** moves is set to one direction Z alone. Needless to say, it may be moved in the direction opposite to the direction Z, or alternately moved in the direction Z and the opposite direction.

With respect to the above-described embodiment, a rewritable film formed of a dyestuff material is adopted as the rewritable recording film 101. The rewritable recording film of the present invention is not limited to this, and other well-known rewritable films (films capable of repeated recording/erasing) can be used. Such films include films of resin or organic low molecular weight materials, thermochromic materials and polymer blend materials.

With respect to the above-described embodiment, a thermal head is used as the heating means. The heating means is not limited to the type directly applying heat. It may be a means capable of applying heat indirectly by utilizing light, such as an LED head, a liquid crystal head, a laser head or the like. Such a means also enables the same effects of the invention.

Figure 35:
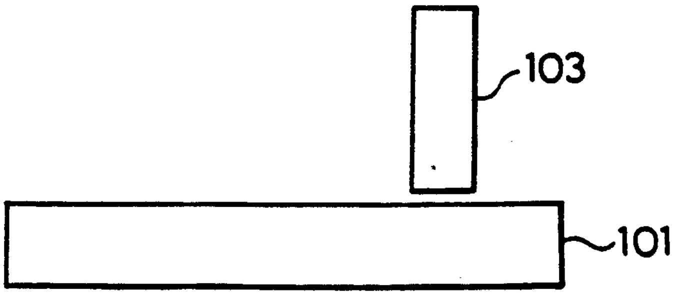
FIG. 35 is a schematic diagram of the thermal head and he rewritable recording film of the rewritable recording/display apparatus shown in FIG. 34.

In the above-described embodiment, rewritable recording film 101 is rolled. The arrangement may alternatively such that cut sheets of rewritable recording film 101 are provided and color development and color extinction are effected with thermal head 103, as shown in FIG. 35.

What is claimed is:

1. A rewritable recording/display apparatus comprising:

a rewritable recording medium in which color development reaction occurs by first thermal energy at a first predetermined temperature, and in which a color extinguishing reaction occurs by second thermal energy at a second predetermined temperature lower than the first predetermined temperature, said rewritable recording medium being capable of repeatedly performing recording and erasing of images;

at least one heating means for heating said rewritable recording medium by heating by said first or second thermal energy;

recording control means for outputting an image recording signal according to a desired display image to make said heating means produce heat of said first thermal energy corresponding to the desired display image; and erasing control means to output an image erasing signal according to a desired image erasing range to make said heating means produce heat of said second thermal energy to substantially erase said display image.

2. A rewritable recording/display apparatus comprising:

a rewritable recording medium capable of recording by thermal energy at a predetermined temperature, capable of erasing by thermal energy at another predetermined temperature different from the recording predetermined temperature, and capable of repeatedly performing recording and erasing of images;

color developing heating means for recording an image on said rewritable recording medium or on a recording sheet separate and spaced from said rewritable recording medium so as to cause a color developing reaction;

erasing means for erasing the image after the image has been recorded;

means for positioning the recording sheet which is separate and spaced from said rewritable recording medium adjacent said color developing heating means so as to enable recording on said recording sheet and subsequent removal of the recording sheet form the apparatus; and selection means for selectively forming said image on either the rewritable recording medium or the recording sheet.

3. An apparatus according to claim 2 wherein one heating means serving as both said color developing heating means and said erasing heating means is provided.

4. An apparatus according to claim 2 wherein said color developing heating means includes reduction image control means for recording a reduced image by outputting a reduced image data.

5. An apparatus according to claim 2, including means for positioning said color developing heating means adjacent to either the rewritable recording medium or the recording sheet.

6. An apparatus according to claim 2, wherein said color developing means includes a thermal head having heating elements on opposite sides thereof for respectively confronting the rewritable recording medium and the recording sheet.

7. An apparatus according to claim 2, wherein said color developing means includes a thermal head capable of pivoting between a first position adjacent said rewritable recording medium and a second position adjacent said recording sheet.

8. A method of erasing a rewritable record, comprising the steps of:

heating a rewritable recording medium by heating means for heating said recording medium with first thermal energy to form an image thereon;

determining a first extent to which the rewritable recording medium is fed to enable formation of one line of said image during said image forming step;

setting a second extent, to which the rewritable recording medium is fed to enable erasing of one line of said image during an erasing step, to a value equal to or less than said first extent;

making the heating means produce heat of second thermal energy to heat the rewritable recording medium so as to erase the formed image.

9. A method of erasing written image data on a rewritable recording medium in which an image is formed by heating the medium by a first thermal energy in response to an image recording signal, the image being formed in a recording area of the medium, comprising the steps of:

providing thermal means for heating said recording medium including a plurality of heating elements; and heating the medium by a second thermal energy in response to an image erasing signal to erase the image;

wherein said step of heating the medium by the second thermal energy is carried out by heating the thermal means so that the medium is heated by the plurality of heating elements beyond the recording area in which the image is formed.

10. The method of claim 9 wherein a plurality of high frequency energizing pulses are applied to said heating means for applying said second thermal energy so as to produce heat in accordance with said plurality of pulses to erase the image.

* * * * *

UNITED STATES PATENT AND TRADEMARK OFFICE

CERTIFICATE OF CORRECTION

PATENT NO. : 5,231,505

DATED : July 27, 1993

INVENTOR(S) : N. Watanabe et al.

It is certified that error appears in the above-indentified patent and that said Letters Patent is hereby corrected as shown below:

On the title page, under Foreign Patent Documents, "62-1161190" should read --62-116190--

Col. 4, line 1, "648354" should be --64-18354--.

Col. 10, line 7, "50" should be --30--.

Col. 10, line 9, "50" should be --30--.

Col. 10, line 22, "50" should be --30--.

Col. 10, line 51, "43" should be --23--.

Col. 10, line 53, "50" should be --30--.

Col. 10, line 55, "50" should be --30--.

Col. 10, line 56, "49" should be --29--.

Col. 10, line 57, "51" should be --31--.

Col. 10, line 65, "50" should be --30--.

Col. 11, line 1, "50" should be --30--.

Col. 11, line 4, "49" should be --29--.

Col. 11, line 5, "43" should be --23--.

Col. 11, line 7, "50" should be --30--.

Col. 11, line 8, "49" should be --29--.

UNITED STATES PATENT AND TRADEMARK OFFICE

CERTIFICATE OF CORRECTION

PATENT NO. : 5,231,505

DATED : July 27, 1993

INVENTOR(S) : N. Watanabe et al.

It is certified that error appears in the above-indentified patent and that said Letters Patent is hereby corrected as shown below:

Col. 11, line 9, "50" should be --30--.

Col. 11, line 12, "50" should be --30--.

Col. 11, line 14, "49" should be --29--.

Col. 11, line 19, "50" should be --30--.

Col. 11, line 26, "50" should be --30--.

Col. 11, line 30, "47" should be --27--.

Col. 11, line 38, "50" should be --30--.

Col. 11, line 39, "49" should be --29--.

Col. 11, line 40, "49" should be --29--.

Col. 11, line 41, "49" should be --29--.

Col. 11, line 42, "49" should be --29--.

Col. 11, line 43, "49" should be --29--.

Col. 11, line 45, "43" should be --23--.

Col. 11, line 56, "49" should be --29--.

Col. 11, line 58, "50" should be --30--.

Col. 11, line 62, "50" should be --30--.

Col. 11, line 63, "50" should be --30--.

UNITED STATES PATENT AND TRADEMARK OFFICE
CERTIFICATE OF CORRECTION

PATENT NO. : 5,231,505

DATED : July 27, 1993

INVENTOR(S) : N. Watanabe et al.

It is certified that error appears in the above-identified patent and that said Letters Patent is hereby corrected as shown below:

Col. 12, line 7, "50" should be --30--.

Col. 12, line 9, "49" should be --29--.

Col. 12, line 12, "50" should be --30--.

Col. 12, line 15, "49" should be --29-- (both occurrences).

Col. 12, line 24, "49" should be --29--.

Col. 12, line 25, "50" should be --30--.

Col. 12, line 34, "50" should be --30--.

Col. 12, line 40, "43" should be --23--.

Col. 12, line 43, "49" should be --29--.

Col. 12, line 49, "50" should be --30--.

Col. 12, line 50, "49" should be --29--.

Col. 12, line 51, "49" should be --29--.

Col. 12, line 58, "43" should be --23--.

Col. 12, line 60, "50" should be --30--.

Col. 12, line 63, "50" should be --30--.

Col. 12, line 66, "50" should be --30--.

UNITED STATES PATENT AND TRADEMARK OFFICE

CERTIFICATE OF CORRECTION

PATENT NO. : 5,231,505

DATED : July 27, 1993

INVENTOR(S) : N. Watanabe et al.

It is certified that error appears in the above-indentified patent and that said Letters Patent is hereby corrected as shown below:

Col. 13, line 10, "50" should be --30--.

Col. 13, line 12, "49" should be --29--.

Col. 13, line 16, "49" should be --29--.

Col. 13, line 25, "49" should be --29--.

Col. 13, line 35, "49" should be --29--.

Col. 13, line 38, "49" should be --29--.

Col. 13, line 43, "49" should be --29--.

Col. 13, line 45, "50" should be --30--.

Col. 13, line 52, "50" should be --30--.

Col. 13, line 53, "49" should be --29--.

Col. 13, line 54, "50" should be --30--.

Col. 13, line 56, "50" should be --30--.

Col. 13, line 59, "50" should be --30--.

Col. 13, line 65, "50" should be --30--.

Col. 14, line 2, "50" should be --30--.

Col. 14, line 5, "50" should be --30--.

UNITED STATES PATENT AND TRADEMARK OFFICE
CERTIFICATE OF CORRECTION

PATENT NO. : 5,231,505
DATED : July 27, 1993
INVENTOR(S) : N. Watanabe et al.

It is certified that error appears in the above-identified patent and that said Letters Patent is hereby corrected as shown below:

Col. 14, line 7, "49" should be --29--.

Col. 14, line 7, "50" should be --30--.

Col. 14, line 10, "50" should be --30--.

Col. 14, line 29, "50" should be --30--.

Col. 14, line 31, "50" should be --30--.

Col. 14, line 33, "51" should be --31--.

Col. 14, line 33, "49" should be --29--.

Col. 14, line 34, "50" should be --30--.

Col. 14, line 37, "51" should be --31--.

Col. 14, line 41, "50" should be --30--.

Col. 14, line 46, "49" should be --29--.

Col. 14, line 48, "49" should be --29--.

Col. 14, line 49, "50" should be --30--.

Col. 14, line 53, "49" should be --29--.

Col. 14, line 55, "50" should be --30--.

Col. 14, line 59, "49" should be --29--.

UNITED STATES PATENT AND TRADEMARK OFFICE

CERTIFICATE OF CORRECTION

PATENT NO. : 5,231,505

DATED : July 27, 1993

INVENTOR(S) : N. Watanabe et al. Page 6 of 7

It is certified that error appears in the above-indentified patent and that said Letters Patent is hereby corrected as shown below:

Col. 14, line 60, "50" should be --30--.

Col. 14, line 62, "49" should be --29--.

Col. 14, line 65, "49" should be --29--.

Col. 14, line 66, "43" should be --23--.

Col. 15, line 6, "49" should be --29--.

Col. 15, line 16, "50" should be --30--.

Col. 15, line 17, "50" should be --30--.

Col. 15, line 19, "50" should be --30--.

Col. 15, line 25, "50" should be --30--.

Col. 15, line 60, "50" should be --30--.

Col. 15, line 64, "49" should be --29--.

Col. 15, line 66, "50" should be --30--.

Col. 15, line 68, "49" should be --29--.

Col. 16, line 6, "50" should be --30--.

Col. 16, line 15, "49" should be --29--.

Col. 17, line 22, "form" should be --from--.

UNITED STATES PATENT AND TRADEMARK OFFICE

CERTIFICATE OF CORRECTION

PATENT NO. : 5,231,505

DATED : July 27, 1993

INVENTOR(S) : N. Watanabe et al.

It is certified that error appears in the above-indentified patent and that said Letters Patent is hereby corrected as shown below:

Col. 17, line 40, "80°" should be --80--.

Col. 17, line 47, "int he" should be --in the--.

Col. 18, line 6, "int he" should be --in the--.

Col. 18, line 21, "an" should be --and--.

Col. 18, line 55, "is" should be --if--.

Signed and Sealed this

Tenth Day of May, 1994

Attest:

BRUCE LEHMAN

Attesting Officer

Commissioner of Patents and Trademarks